United States Patent
Mercier

(10) Patent No.: US 11,878,440 B1
(45) Date of Patent: Jan. 23, 2024

(54) UNMANNED AERIAL VEGETATION TRIMMING SYSTEM

(71) Applicant: Craig Mercier, Pasadena, MD (US)

(72) Inventor: Craig Mercier, Pasadena, MD (US)

( * ) Notice: Subject to any disclaimer, the term of this patent is extended or adjusted under 35 U.S.C. 154(b) by 800 days.

(21) Appl. No.: 16/734,674

(22) Filed: Jan. 6, 2020

Related U.S. Application Data

(60) Provisional application No. 62/788,253, filed on Jan. 4, 2019.

(51) Int. Cl.
| | |
|---|---|
| *B27B 5/10* | (2006.01) |
| *A01G 3/08* | (2006.01) |
| *B64C 39/02* | (2023.01) |
| *B64U 101/00* | (2023.01) |

(52) U.S. Cl.
CPC ............. *B27B 5/10* (2013.01); *A01G 3/088* (2013.01); *B64C 39/024* (2013.01); *B64U 2101/00* (2023.01)

(58) Field of Classification Search
CPC .. A01G 3/08; A01G 3/085–088; A01G 23/00; A01G 23/095; B27B 17/00; B27B 17/008; B64C 39/024; B64C 2201/126
See application file for complete search history.

(56) References Cited

U.S. PATENT DOCUMENTS

| | | | | |
|---|---|---|---|---|
| 2,707,008 A | * | 4/1955 | Bannister | A01G 23/00 144/4.1 |
| 3,343,613 A | * | 9/1967 | Carnesecca, Jr. et al. | B27B 17/0008 30/381 |
| 4,142,292 A | | 3/1979 | Ulrich | |
| 4,532,707 A | | 8/1985 | Allen | |
| 4,554,781 A | * | 11/1985 | Rogers | A01G 23/095 56/DIG. 9 |
| 4,815,263 A | * | 3/1989 | Hartung | A01G 23/095 144/24.13 |
| 4,916,818 A | * | 4/1990 | Panek | A01G 3/08 30/383 |

(Continued)

FOREIGN PATENT DOCUMENTS

CN 107318492 A 11/2017

OTHER PUBLICATIONS

"Jamie Hyneman Hacks a Drone"; screen captures of https://www.youtube.com/watch?v=TWLpMCFUBB0; Originally posted by Popular Mechanics on May 2, 2017.

(Continued)

*Primary Examiner* — Jason Daniel Prone

(74) *Attorney, Agent, or Firm* — Rosenberg, Klein & Lee

(57) ABSTRACT

A system for unmanned aerial vegetation trimming includes an aerial vehicle configured for selectively controlled unmanned flight over and about the vegetation to be trimmed. The system also includes a cutting assembly having an adjustable cutting head selectively actuated for trimming the vegetation. The cutting head is adjustable on the cutting assembly for optimal positioning relative to the vegetation to be trimmed. A support assembly is coupled to the aerial vehicle and cutting assembly, the support assembly being retractably extended to suspend the cutting assembly from the aerial vehicle. The support assembly is configured to maintain consistent positioning of the cutting assembly relative to the aerial vehicle during actuation thereof to trim the vegetation.

8 Claims, 16 Drawing Sheets

(56) References Cited

U.S. PATENT DOCUMENTS

| | | | | |
|---|---|---|---|---|
| 4,984,757 | A * | 1/1991 | Hartung | A01G 23/095 144/24.13 |
| 5,319,856 | A | 6/1994 | Kolehmainen | |
| 5,961,070 | A * | 10/1999 | Bradford | A01G 23/095 144/335 |
| 6,167,928 | B1 * | 1/2001 | Jarman | A01G 23/08 144/34.1 |
| 6,263,932 | B1 * | 7/2001 | Chalifoux | A01G 23/08 144/34.1 |
| 6,345,445 | B1 | 2/2002 | Schofield | |
| 6,394,156 | B1 * | 5/2002 | Ahvenlampi | A01G 23/091 144/4.1 |
| 6,418,989 | B1 * | 7/2002 | Jarman | A01G 23/08 144/34.1 |
| 6,484,409 | B2 | 11/2002 | Campbell et al. | |
| 8,156,654 | B2 | 4/2012 | Reed et al. | |
| 8,191,268 | B2 | 6/2012 | Willetts | |
| 8,382,003 | B2 | 2/2013 | Grohman et al. | |
| 9,004,973 | B2 * | 4/2015 | Condon | A63F 13/235 446/37 |
| 9,198,363 | B2 | 12/2015 | Vian et al. | |
| 9,420,748 | B2 | 8/2016 | Chan et al. | |
| 9,456,559 | B2 * | 10/2016 | Dunn | A01G 23/095 |
| 9,522,732 | B1 | 12/2016 | Froloff | |
| 9,539,717 | B2 * | 1/2017 | Fuchs | B27B 17/00 |
| 9,852,644 | B2 | 12/2017 | Salnikov et al. | |
| 9,944,366 | B2 * | 4/2018 | Tang | B64C 39/024 |
| 9,969,494 | B1 * | 5/2018 | Buchmueller | B64C 39/024 |
| 10,071,804 | B1 * | 9/2018 | Buchmueller | B64C 39/024 |
| 10,358,196 | B2 * | 7/2019 | Tang | B64C 39/024 |
| 10,368,496 | B2 * | 8/2019 | Chan | B64C 39/024 |
| 10,561,071 | B2 * | 2/2020 | Hawkins | A01G 23/095 |
| 10,796,275 | B1 * | 10/2020 | Wilkins | B64C 39/024 |
| 10,869,433 | B1 * | 12/2020 | Haddock | A01G 23/095 |
| 10,875,644 | B2 * | 12/2020 | Bosworth | B64C 39/024 |
| 11,235,890 | B1 * | 2/2022 | Dahlstrom | B64D 47/08 |
| 11,297,773 | B1 * | 4/2022 | Lane | A01G 3/088 |
| 11,358,717 | B2 * | 6/2022 | Wabnegger | B64C 39/024 |
| 2009/0000698 | A1 * | 1/2009 | Beresford | A01G 23/08 144/34.1 |
| 2011/0144828 | A1 | 6/2011 | Chengalva | |
| 2014/0096399 | A1 * | 4/2014 | Fuchs | B27B 17/00 30/383 |
| 2014/0209210 | A1 * | 7/2014 | Dunn | A01G 23/095 144/24.13 |
| 2014/0299230 | A1 * | 10/2014 | Cox, III | A01G 23/095 144/24.13 |
| 2016/0307448 | A1 | 10/2016 | Salnikov et al. | |
| 2017/0094909 | A1 | 4/2017 | Bhavani | |
| 2017/0359943 | A1 | 12/2017 | Calleija et al. | |
| 2018/0027772 | A1 * | 2/2018 | Gordon | G05D 1/104 |
| 2018/0035606 | A1 | 2/2018 | Burdoucci | |
| 2019/0102623 | A1 * | 4/2019 | Flood | B64C 39/024 |
| 2019/0166765 | A1 * | 6/2019 | Maor | B64C 39/024 |
| 2020/0148348 | A1 * | 5/2020 | Bradley | B64C 39/024 |
| 2020/0367441 | A1 * | 11/2020 | Guzmán López | B64C 39/024 |
| 2021/0299845 | A1 * | 9/2021 | Frenken | B64C 39/024 |
| 2021/0339845 | A1 * | 11/2021 | Milan | B64C 39/024 |
| 2022/0174880 | A1 * | 6/2022 | Robinson | A01G 23/095 |
| 2022/0174932 | A1 * | 6/2022 | Ravanat | A01G 3/088 |

OTHER PUBLICATIONS

John Wenz; "Watch Mythbuster Jamie Hyneman Try to Prune a Tree With a Quadcopter"; https://www.popularmechanics.com/flight/drones/a14892/mythbusters-jamie-hynemann-quadcopter-tree/; Originally posted Apr. 2, 2015.

* cited by examiner

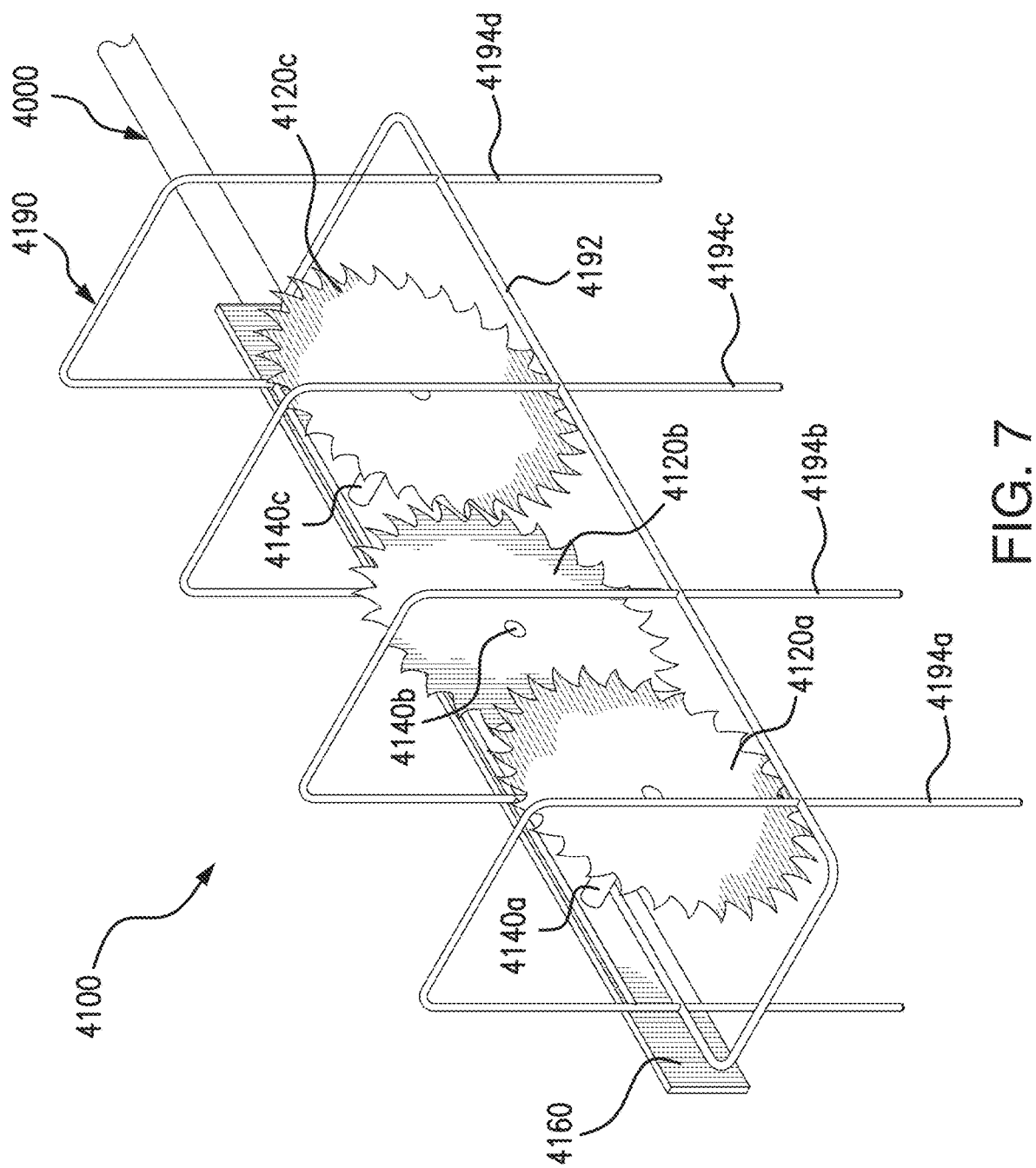

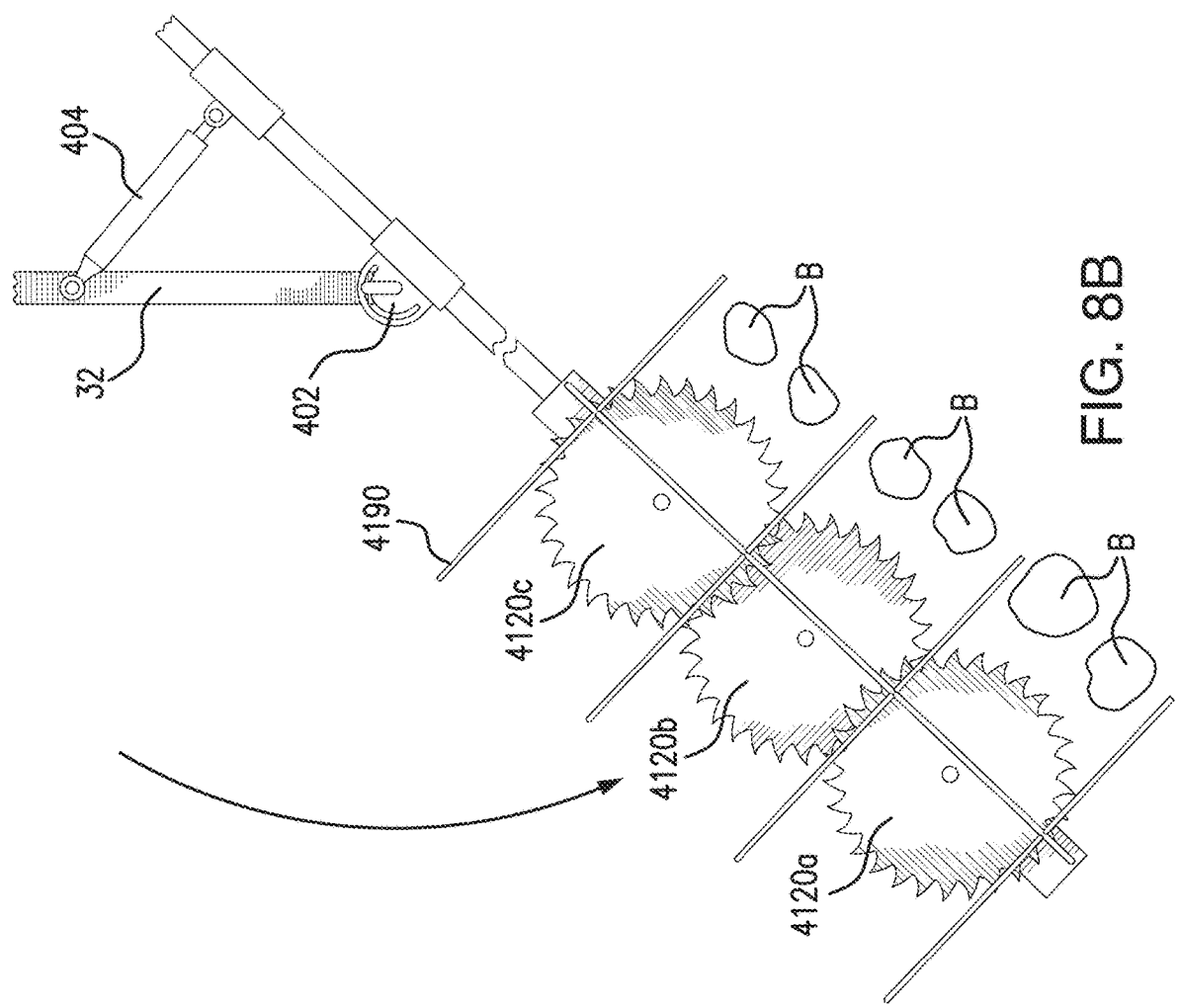

UNMANNED AERIAL VEGETATION TRIMMING SYSTEM

RELATED PATENTS AND APPLICATIONS

This Application is based on U.S. Provisional Patent Application No. 62/788,253, filed Jan. 4, 2019.

BACKGROUND OF THE INVENTION

The subject apparatus is generally directed to a system for unmanned aerial trimming of vegetation. The system provides for use of an unmanned airborne vehicle which is remotely and/or programmably piloted and suitably equipped with cutting equipment adjustably extending therefrom. The cutting equipment is suitably controlled to carry out the trimming operation required, and is held from the vehicle by a suspension assembly. The suspension assembly may be retracted or collapsed as needed relative to the vehicle, yet provides sufficiently stable support to help guide the cutting with ample stability and control to the cutting positions and orientations required.

In a wide variety of applications, there is a need to trim the upper parts of trees and other such vegetation that are—by height, remote location, or otherwise—disposed well beyond the safe reach of ground based trimming tools, vehicles, or other platforms. As used herein, the term "trees" generally encompasses all such vegetation growth in a forested or otherwise wooded area. Trimming typically involves the cutting of limbs having various girths and branching at various angles, with various contours away from the tree trunk. This may be needed in areas where, for instance, sufficient clearance must be maintained to prevent the potentially damaging encroachment of power lines, telecommunications lines, pipelines, or the like extending through broad areas of potentially thick tree growth. Growth around such lines must be trimmed regularly to preserve their safe ongoing use, even in the midst of strong winds. Enough of the branching tree limbs are cut away that they do not pose a snagging hazard to the lines, even when forced by strong winds to sway violently back and forth.

For most effective trimming, the highest hanging portions of the trees must be sufficiently cut away, such that they do not press down or fall upon the lines therebeneath. Moreover, it is preferable to cut from above during trimming to avoid the risk of injury or damage to equipment from falling debris cut from tree limbs overhead. Yet, trees in many areas that require trimming reach heights that the limbs to be trimmed are not safely, let alone easily, accessible from the ground. This is especially so in the more remote and heavily forested, undeveloped areas which are difficult if not practically impossible to get to for the large ground equipment typically needed to reach these towering heights with suitable cutting tools.

For these and other reasons, aerial measures have been employed in the art heretofore to carry out the trimming from above. Typically, bladed cutting tools are suspended from a helicopter or other manned vehicle manned which then flies over and about the areas of interest to position the cutting tools to trim the right portions of the trees below. This operation, while workable, is typically quite expensive both in terms of costs and labor. In addition to the heavy costs of the vehicle, its maintenance and operation, the skilled labor required for its operation and safe upkeep are prohibitive in many applications.

Manned airborne trimming operations like this are also not without serious safety risks. The degree of control over the cutting equipment suspended beneath the vehicle tends to be progressively greater with increasing length of suspension. So the vehicle must maintain relatively low elevation flight during the trimming operation to maintain a manageable degree of control over the cutting equipment. Environmental conditions like variations in the heights of closely clustered trees, changes in wind patterns, and the like make for uncertainties that cannot be fully accounted for in advance. In addition, the very reason for the trimming operation—like the presence of power lines—invariably make for hazardous obstacles for the suspended cutting equipment, which must be carefully maneuvered around.

There is need for a system by which unmanned aerial trimming of vegetation may be carried out in safe and cost-effective manner There is a need for such a system, whereby an unmanned vehicle and its cutting equipment may be remotely or programmably controlled to carry out consistently effective trimming of vegetation. There is need for such a system which is both simple in structure and reliable in operation.

SUMMARY OF THE INVENTION

An object of the present invention is to provide a system that carries out unmanned aerial trimming of vegetation in safe and cost-effective manner.

It is another object of the present invention to provide a system that provides for remotely or programmably control of an unmanned vehicle and its cutting equipment for consistent and effective trimming of vegetation.

It is yet another object of the present invention to provide a system which is both simple in structure and reliable in operation.

These and other objects are attained in a system for unmanned aerial vegetation trimming. The system includes an aerial vehicle configured for selectively controlled unmanned flight over and about the vegetation to be trimmed. The system also includes a cutting assembly having an adjustable cutting head selectively actuated for trimming the vegetation. The cutting head is adjustable on the cutting assembly for optimal positioning relative to the vegetation to be trimmed. A support assembly is coupled to the aerial vehicle and cutting assembly, the support assembly being retractably extended to suspend the cutting assembly from the aerial vehicle. The support assembly is configured to maintain consistent positioning of the cutting assembly relative to the aerial vehicle during actuation thereof to trim the vegetation.

In certain though not necessarily all embodiments, the system employs an aerial vehicle including a drone remotely piloted through a remote control unit.

In certain though not necessarily all embodiments, the system employs a cutting assembly including a longitudinally extended arm portion and a cutting head. The cutting head is disposed adjacent a terminal end of the arm portion, and includes a cutting blade rotatably driven by a powered driving source.

In certain though not necessarily all embodiments, the cutting head of such cutting assembly also includes a frame structure disposed protectively about the cutting blade. The frame structure includes a plurality of guide members spaced apart from one another to guide a vegetation limb transversely into a cutting path of the cutting blade.

In certain other embodiments, the arm portion of such cutting assembly is coupled in angularly adjustable manner to the support assembly. The arm portion is displaceable between and releasably locked at a plurality of transversely extending positions relative to the support assembly.

In certain other embodiments, the cutting head of such cutting assembly is coupled in angularly adjustable manner to the arm portion. The cutting head is displaceable between and releasably locked at a plurality of angular positions relative to the arm portion.

BRIEF DESCRIPTION OF THE DRAWINGS

FIG. 7 is a perspective view, partially cut away, of a multi-blade cutting head of an apparatus formed in accordance with one alternate embodiment of the present invention;

FIG. 8B is a side elevational view, partially cut away, of the cutting assembly and support assembly portions shown FIG. 8, illustrating the cutting assembly adjusted to a second angular position relative to the support assembly during a trimming operation;

DESCRIPTION OF THE PREFERRED EMBODIMENTS

Figure 4:
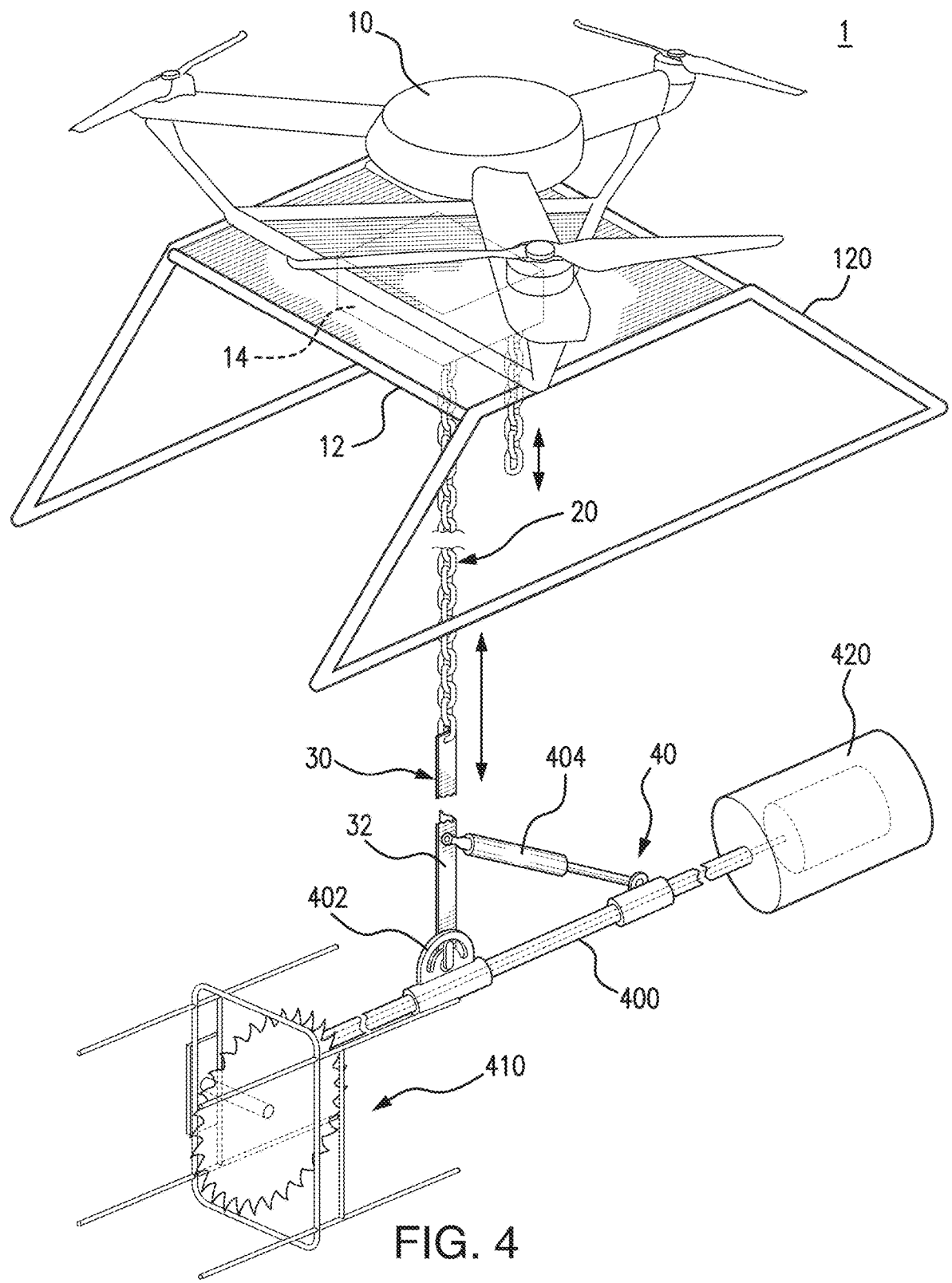
FIG. 4 is a perspective view, partially cut away, of the embodiment of FIG. 1, illustrating the support and cutting assemblies suspended from a vehicle and chassis assembly while airborne.
Figure 5:
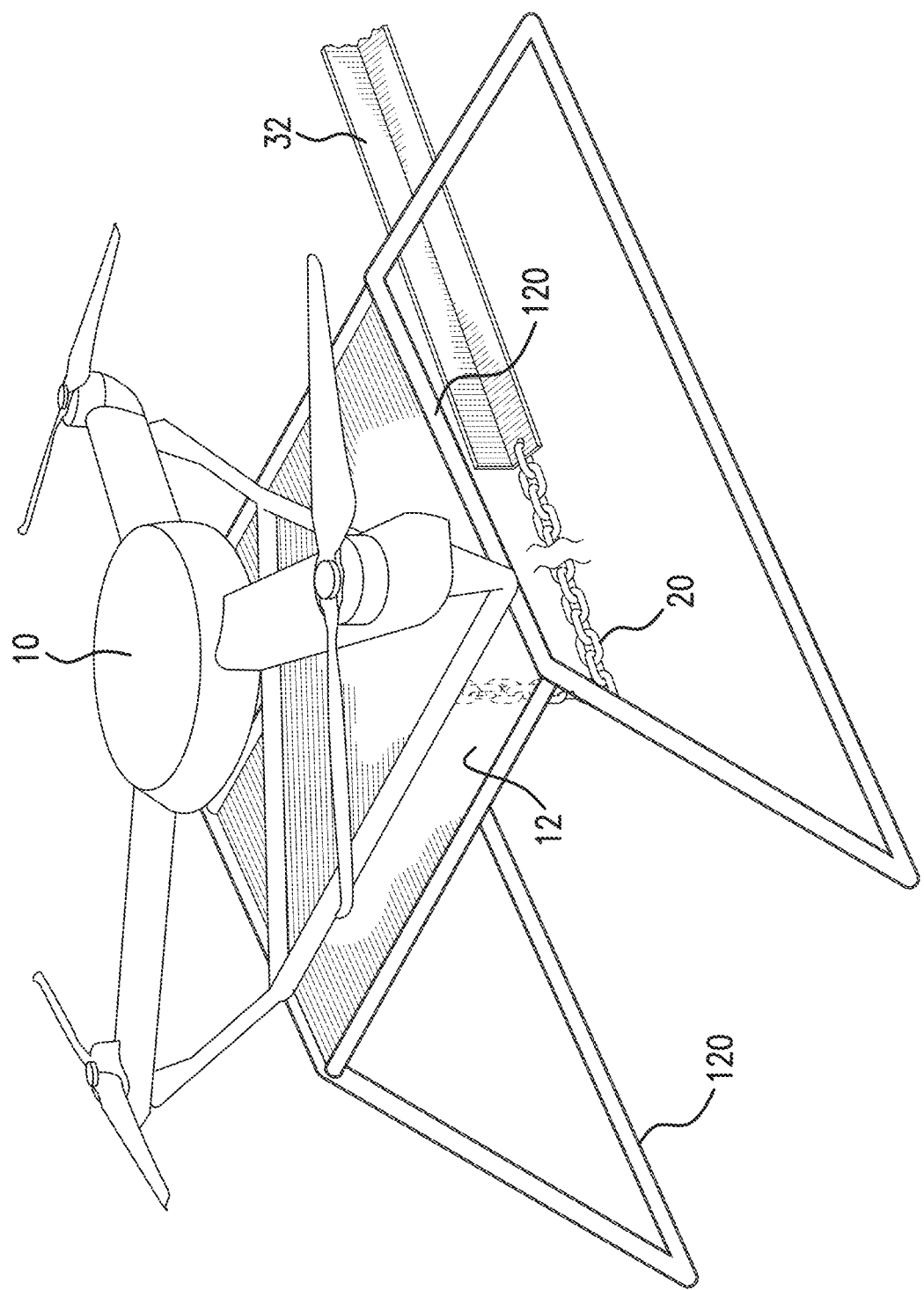
FIG. 5 is a perspective view, partially cut away, of the embodiment of FIG. 1, illustrating the vehicle and chassis assembly landed and a portion of the suspension assembly at rest on a ground surface.
Figure 6:
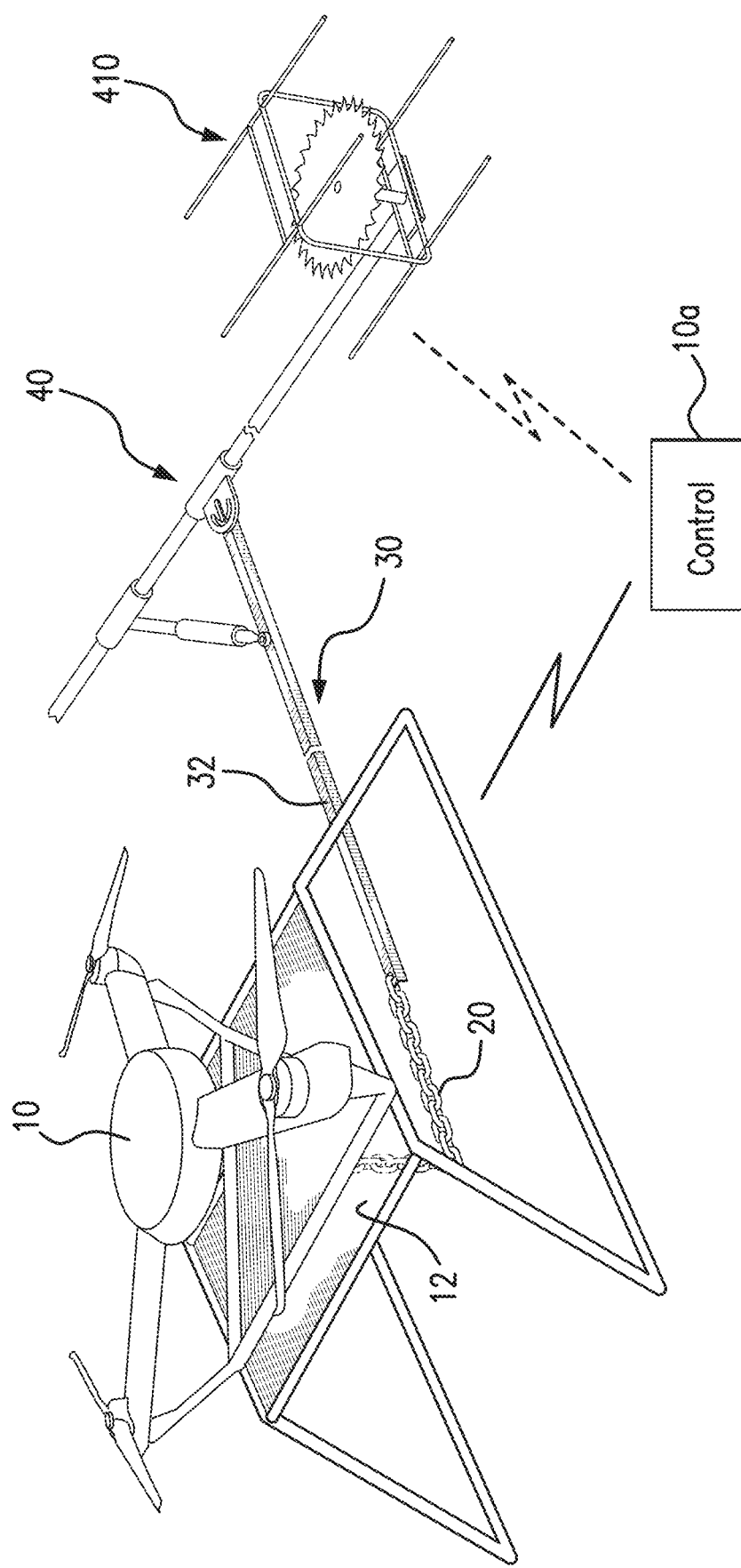
FIG. 6 is a perspective view, partially cut away, of the embodiment of FIG. 1, showing a wider view of the vehicle and chassis assembly landed and a portion of the suspension assembly at rest on a ground surface as illustrated in FIG. 5.

In accordance with certain aspects of the present invention, the subject system for unmanned aerial trimming of vegetation provides for use of a drone or other such unmanned airborne vehicle which is remotely and/or programmably piloted and suitably configured with cutting equipment adjustably extended therefrom. Preferably, the cutting equipment is likewise remotely and/or programmably controlled to carry out the trimming operation required. The cutting equipment is suspended from the airborne vehicle by a suspension assembly that is sufficiently strong and rigid that the cutting equipment may be guided with ample stability and control to the necessary cutting position and orientation. The suspension assembly may be erected to the total length required for a given application by interconnecting a plurality of modular sections. Referring to FIGS. 4-6, for ease of use, a suspension assembly 30 is preferably coupled to a vehicle 10 (or its chassis/frame assembly 12) by a pivotal or flexible attachment 20—at least during takeoff and landing of the vehicle. This allows for the rigid suspension assembly 30 and cutting equipment 40 to pivot with respect to the vehicle and lay at rest on the ground or other supporting surface even while tethered to the vehicle 10 when it is surface-bound. By way of example, a short flexible chain or cable segment 20 may be disposed between suspension assembly 30 and the vehicle 10 or its chassis assembly 12, as is shown in FIG. 4 where the suspension assembly 30 may include a chain or cable 20 passing through the mounting structure/retracting mechanism 14 as seen by the pair of directional arrows to be displaced (up/down) for displacing the supporting member 30 and selectively adjusting the distance between the vehicle chassis frame 12 and the cutting equipment 40. This provides enough slack for the suspension assembly 30 and cutting equipment 40 to tilt and recline along the ground/support surface. Once the vehicle 10 is airborne, the suspension assembly 30 may be secured to the vehicle/chassis assembly by, for instance, drawing the cable/chain 20 tight to remove the slack and lock the suspension assembly 30 against undue displacement relative thereto. This preferably secures the suspension assembly 30, hence the cutting equipment 40, to the vehicle 10 and/or its chassis assembly 12, to guard against unwanted swing, rotation, or kickback when during the cutting equipment's operation.

Alternatively, a pivotal coupling about a pivot pin, or a universal coupling via a ball and socket type structure may be employed between the rigid suspension assembly 30 and the vehicle/chassis assembly 10/12. During landing, the suspension assembly 30 may pivot at the coupling to turn out of the way and leave clearance below the vehicle/chassis assembly 10/12 to safely land. During takeoff, the suspension assembly 30 then rises with the vehicle/chassis assembly 10/12, pivoting back about the coupling to be vertically suspended therefrom when sufficiently airborne.

Figure 10:
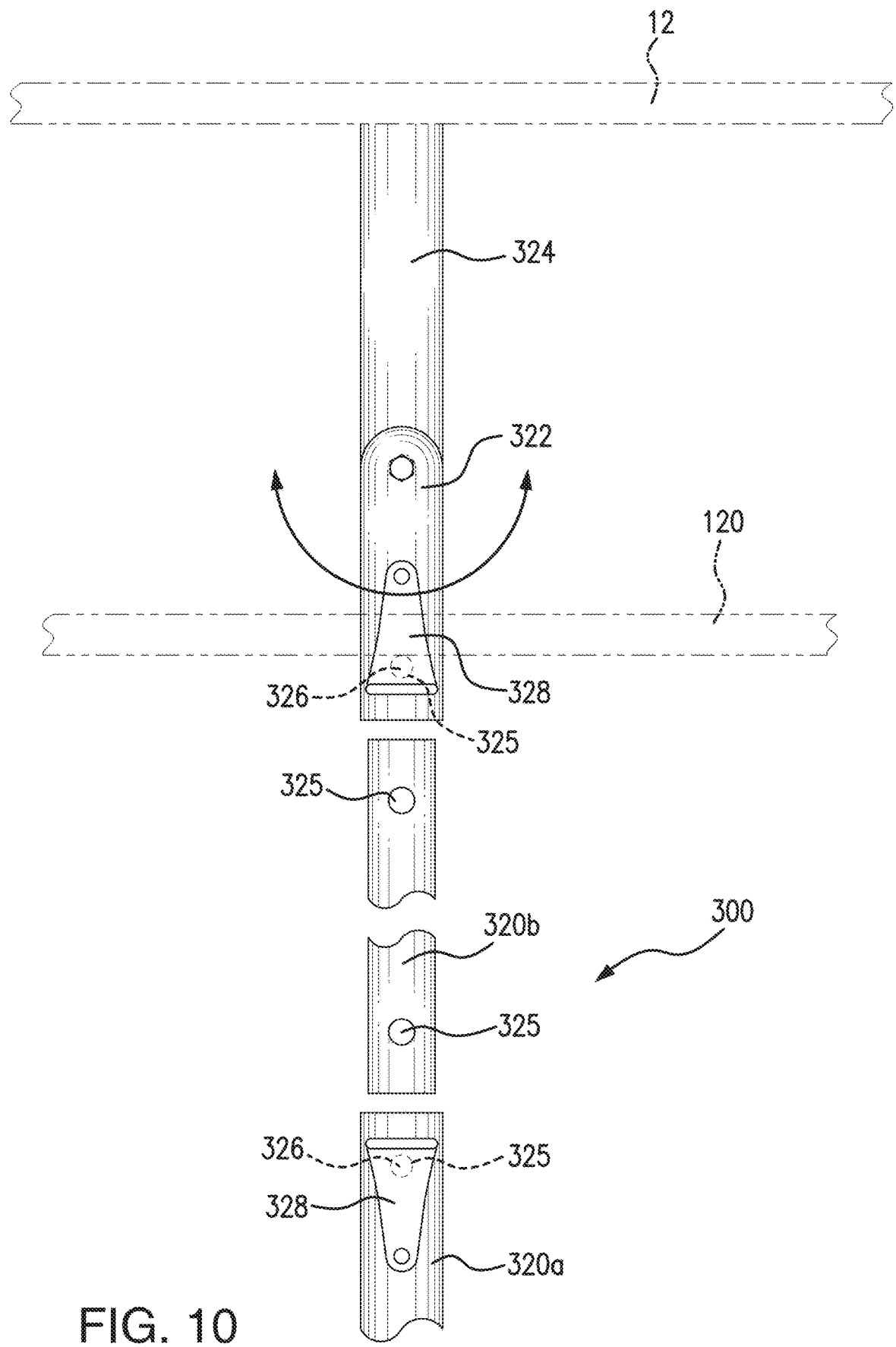
FIG. 10 is an exploded side elevational view, partially cut away, of a support assembly and a vehicle chassis assembly of an apparatus formed in accordance with yet another alternate embodiment of the present invention, illustrating pivotal coupling of the support assembly's support bar segments to one another and to a pivot stem that is in turn pivotally coupled to the chassis assembly for facilitating pivotally 'folded' retraction of the support assembly and cutting assembly when at rest with the vehicle and chassis assembly landed.

An example of this type of embodiment is illustrated in FIG. 10. In this embodiment, the flexible support link 20 (chain, cable, . . . ) and its mounting structure/retracting mechanism 14 are replaced by an attachment base (324) provided underneath the deck of the drone vehicle's chassis assembly and a pivoting stem (322) coupled in pivotally displaceable manner thereto. Depending on the embodiment and application, this coupling may define pivoting movement about the axis of a pivot pin member, or more universally about a ball and socket-type joint. In the embodiment shown, the pivoted movement is defined about the axis of a pivot pin member. This serves to limit the direction in which the pivot stem extends when pivoted, relative to the other parts of the vehicle chassis assembly.

Since the chassis assembly 12 in this embodiment is formed with a sled-like structure, having a chassis assembly base 120 formed by a plurality of mutually-offset feet, the pivoting direction is predefined such that the pivoting stem and the attached support assembly do not interfere with these feet of the chassis assembly base 120. Moreover, the pivotal coupling between the attachment base 324 and the pivoting stem 322 is disposed at a point that is elevated above the chassis assembly base 120 enough to provide sufficient clearance for safe and convenient folding of the supporting assembly 30 (and the cutting assembly 40 attached thereto) when the vehicle 10 and supporting chassis assembly 12 lands and takes off.

As a further alternative, suitably configured sleds, skid, or other stable supporting/protective base 120 may be employed to keep the landed vehicle 10 sufficiently elevated for the cutting equipment 40 to withstand dragging and resist damaging tip/roll/impact on the ground during takeoff and landing of vehicle 10. For example, a suitably configured docking structure may be employed, which elevates the vehicle 10 and maintains clearance below (when docked) for attachment of the rigid suspension assembly 30 and cutting equipment 40 beneath it when the vehicle 10 is not airborne.

Turning to FIGS. 4-6, the system 1 preferably includes a drone or other such suitable vehicle 10 that may be remotely piloted with precise control to which a suspension assembly 30 is coupled. A cutting assembly 40 is coupled at or near the bottom free end of the suspension assembly 30. The vehicle 10 and the cutting assembly 40 may be controlled by any suitable remote control measures known in the art. As shown, a remote control unit 10a may control both the vehicle 10 and cutting assembly 40 remotely, or may control the vehicle 10 directly and the cutting assembly 40 more indirectly through locally equipped control measures provided therefor on the vehicle itself. Such control of vehicle flight and/or cutting assembly reconfiguration and actuation may alternatively be programmably implemented on the vehicle 10 and/or cutting assembly 40 and initialized and activated pre-flight by suitable control measures.

The suspension assembly 30 preferably includes a plurality of rigid bar, rod, or other structural member sections 32 which may snap together with a pin, clip, bolt, or other releasable fastening measures. The resulting structure is collectively long enough to reach the trees below from the drone 10 hovering above the tree line. In certain applications, for instance, the trees may be on average about 120 feet tall, requiring the cutting assembly 40 to reach a significant distance below the tree line from above for adequate trimming of the trees' upper and intermediate limbs. Depending on the species, the leaves and branches may be thick, so the clearance that must be maintained above the tree line may vary considerably.

The number of bar segments 32 would be varied to suit the requirements of the particularly intended application, and to the extent supported by the size, power, and performance capabilities of the given drone 10 and its chassis 12. The idea is to realize a highly flexible system, to which modular bar segments 32 may be adjustably added or removed, depending on the clearance required above the tree line.

By way of example, in certain illustrative applications and embodiments for instance, if the system 1 were to trim about the top 20 feet of the tree, a user may choose to employ a suspension assembly 30 of about 50 feet in length. If the user wishes to trim further below the tree line, then a greater length suspension assembly 30 may be employed while preserving a predetermined minimum clearance above the tree line for safety.

In typical applications, the minimum clearance to between the bottommost part of the drone 10 and its chassis 12 and the topmost part of the tree below is preferably though not necessarily about 30 feet. The optimum clearance will depend on numerous factors, of course, including typical flight speeds, wind, precipitation, temperature, visibility, and the like.

Preferably, the drone 10 and/or its chassis structure 12 are provided with a mounting structure/retracting mechanism 14 such that the suspension bar assembly 30 is fixedly secured to guard against substantial displacement either linearly or angularly. That is, the suspension assembly 30 is secured against rotating about its axis relative to the drone 10 and/or the chassis structure 12 to which it is mounted. This torsional and longitudinal stiffness and rigidity ensures efficient transfer of turning and other such directional/positional controlling forces applied thereto by the drone's maneuvering. So if the drone 10 makes a turn of direction, the attached assemblies turn accordingly with the drone 10. Likewise, if the drone 10 is tilted to one side or the other, the attached cutting equipment's blade angle, for instance, is tilted accordingly sideways.

The suspension assembly's bar sections 32 may be of any suitable diametric or sectional dimension so long as sufficient mount or securement measures are taken to preserve torsional (turning or twisting) stiffness/rigidity as well as linear (lengthwise) stiffness/rigidity. Each bar segment 32 in the illustrated embodiment, for example, is preferably formed as an angled bar member whose angled sectional contour facilitates overlapped nesting of consecutively joined segments 32. Each of these bar segments 32 may be suitably formed with openings and/or slots to minimize its strength-to-weight ratio without compromising rigidity. The openings and slots may then serve to accommodate fastening by bolted fasteners, or slotted engagement by mated hooking elements, such as button-like structures protruding from the adjoining bar segment. The bar segments 32 may be formed of graphite, titanium, aluminum, steel, or any other suitable material known in the art having the combination of strength, rigidity, and other structural properties required for the particularly intended application while being sufficiently light in weight to duly preserve maneuverability and control of the cutting assembly 40.

In certain simpler embodiments, the bar segments 32 may each be formed with flattened bar configurations, much like the shape of a lengthened yard stick of sorts. Made out of titanium, graphite, or other such strong, rigid, but light material, consecutive bar segments 32 would be interconnected in line and in planar engagement. The bar segments 32, as well as the interconnection structure therebetween, are each of such material and structural configuration to resist any substantial twisting or flex during use. That is, they are each thick enough and strong enough so to resist twisting, even at long collective lengths. Preferably, they are provided for the user in one or more unit lengths, such as 8-foot, 10-foot, and/or other unit segment lengths, as needed to suit the particularly intended application.

When consecutive bar segments 32 are interconnected by slotted engagement, the button-like hooking member may be spring-loaded in certain embodiments and applications. The button member may also be protected against accidental release by a protective guard formed on one the given bar segment to extend at least partially over top of it. They are thereby shielded from direct disengaging impact with tree limbs. Alternatively or supplementally, adjoining bar segments 32 may be through-bolted or wing-nutted to be fastened together.

Figure 11:
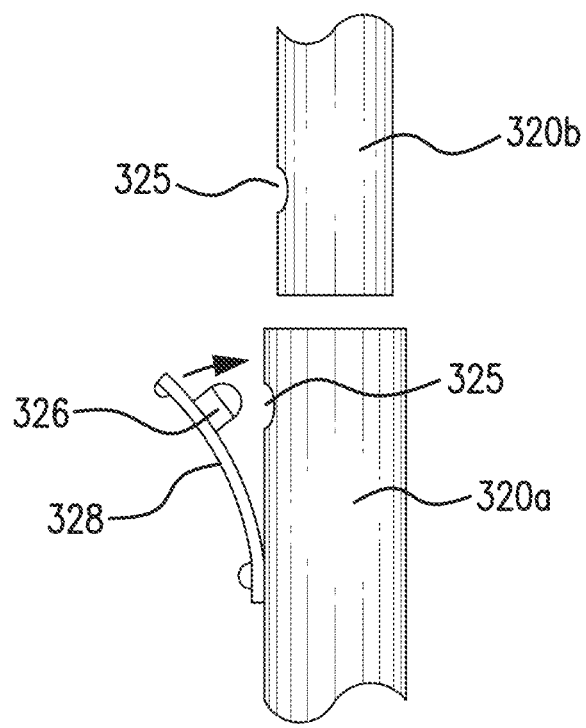
FIG. 11 is an exploded side elevational view, partially cut away, of the support assembly of FIG. 10, illustrating a releasably locked joint between support assembly segments.
Figure 12:
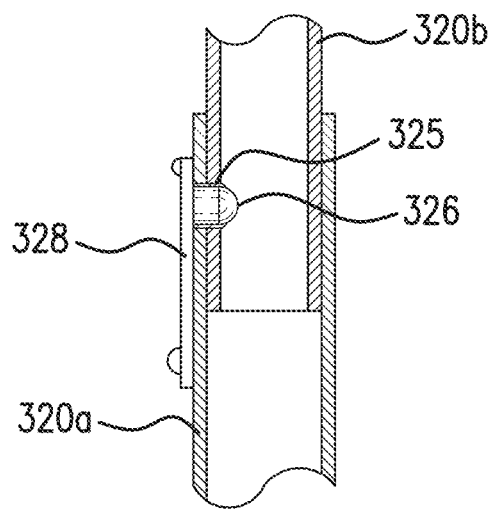
FIG. 12 is a sectional side view, partially cut away, of the support assembly of FIG. 11, illustrating the support assembly segments telescopically joined and releasably locked together.

In the alternate embodiment illustrated in FIGS. 10-12, one or more support bars 320a, 320b may be coupled to a pivoting stem 322. The pivoting stem as well as each support bar segment 320a, 320b in that embodiment is formed with a tubular contour having either a male (inner) or female (outer) configuration for mating with another segment, with the topmost support bar segment being coaxially coupled in telescopic manner to the pivoting stem 322. If the pivoting stem 322 is formed with a female configuration to telescopically receive a support bar segment therein (that is, the pivoting stem 322 is formed with a sleeve configuration rather than an insert tube configuration), the first support bar segment is of the complementary male configuration (as illustrated). The upper end portion of the first support bar segment then extends coaxially into the open bottom end of the pivoting stem 322. Conversely, if the pivoting stem 322 were formed more with a male configuration, the first support bar segment coupled thereto would be of female configuration, such that the upper end portion of the first support bar segment would coaxially ensleeve the bottom end of the pivoting stem 322. Preferably, consecutive support bar segments of the support assembly 300 are formed with complementary mating configurations in this manner, with one being of male support bar type 320b and the other being of female support bar type 320a.

Each junction between the pivoting stem 322 and a support bar segment 320a, 320b or between consecutive support bar segments 320a, 320b so intercoupled in telescopic manner is preferably secured by inserting a pin 326 into aligned through holes 325 of the joined pivoting stem/support bar segments. Such securement pin 326 is formed to project from a resilient tab 328 that is provided at the joining end of each female configured stem or support bar segment 320a. The resilient tab 328 is formed of a metallic material or other such suitable material with a leaf spring-type configuration. It is affixed at one end to the given stem/support bar segment 320a and terminates at a free end that is biased to bear against a through hole 325 of that segment 320a but is otherwise displaceable by resilient deflection away from the hole 325. A securement pin 326 extends from this free end portion towards the segment's hole 325 to engage the same when the resilient tab 328 is in its undeflected position, bearing against the outer surface of the segment 320a.

When a male segment 320b is inserted into the female segment 320a for telescopic engagement therewith, the inserted end bears against the pin 326 and urges the pin 326 outward against the bias force of the resilient tab 328. The pin is thereby caused to displace out of the way, deflecting the resilient tab 328 until a corresponding through hole 325 in the inserted male segment 320b aligns with the through hole 325 in the surrounding portions of receiving female segment 320a. At that point, the pin 326 'clicks' into the inserted male segment's hole 325, responsive to the biasing force of the resilient tab 328. When it comes time to disengage the joint coupling, a user may simply withdraw the pin 326 by pulling the free end of the resilient tab 328 away from an outer female segment 320a and deflecting the same to unlock the inserted male segment 320b. The male segment 320b may then be withdrawn from the female segment 320a.

Referring to FIGS. 1-6, the cutting assembly 40 is coupled at or near the bottommost end of the suspension bar assembly 30 to be firmly suspended beneath the drone 10 by such suspension bar assembly 30. The cutting assembly 40 preferably includes a cutting head 410 and drive power plant 420 portions coupled to a tubular arm-like drive shaft housing portion 400 (or "drive shaft" portion) extending therebetween. The arm portion 400 forms a cross beam-type structure that is intermediately coupled in transversely directed manner at or near the bottom end of the suspension bar assembly 30. In this embodiment, the arm portion 400 of the cutting assembly 40 is pivotally coupled substantially at or about its midpoint to the suspension assembly 30, such that the cutting head 410 and power plant 420 portions substantially counterbalance one another about that pivot point. A tilt mechanism 402 of suitable type and configuration known in the art is preferably coupled between the arm portion 400 and the suspension assembly 30 to pivotally displace the arm portion 400 adjustably about the pivot point, to a selected angular position relative to the suspension assembly 30. The tilt mechanism 402 is preferably operated in conjunction with a stabilizing arm 404, and preferably equipped for automated actuation for selective and/or adaptive angular positioning responsive to operational needs.

A mechanism for such automated actuation may include a motorized gear unit which may be remotely controlled to selectively angle the cutting blade for the appropriate trimming cut. While shown at approximately 90° angle relative to the suspension assembly 30 in FIG. 1, the arm portion 400 may be adjusted to other suitable angular positions relative to the suspension assembly 30 to facilitate cutting at various other sideways orientations, as needed. The automated actuation mechanism may employ a suitable electronic servo device in this regard.

In certain embodiments a second automated actuation mechanism may be employed between the cutting head 410 and the arm portion 400. That second actuation mechanism may be remotely controlled to tilt the cutting head 410 and/or its blade 412 to provide another degree of freedom for angularly orienting the cutting plane of the blade 412. For example, the second actuation mechanism may be controlled to tilt the cutting blade 412 angularly about the axis of the arm portion 400.

During system operation, a user may actuate a first controller to cause the arm portion 400 to tilt down as needed. The user may then actuate a second controller to cause the cutting blade 412 to responsively tilt sideways towards or away from the upper side of the arm portion 400 as needed.

Turning more closely to FIGS. 1-6, the cutting assembly 40 is preferably formed in the illustrated embodiment with a longitudinally extended drive shaft/arm portion 400 that is supported by an angularly displaceable coupling to the suspension bar assembly 30 at an intermediate point (of the drive shaft 400). Preferably, this coupling is a pivotally displaceable one, employing a tilt mechanism 402 of geared or other suitable construction such that the drive shaft 400 may be tilted up or down as needed from a transverse angular orientation relative to that support assembly 30. The drive shaft 400 is preferably provided with a stabilizing arm 404 extending to the support assembly 30. The stabilizing arm 404 operates in cooperation with the tilt mechanism 402 to provide adjustable stabilizing and strength reinforcing support. It is formed, for example, in the illustrated embodiment as a piston and cylinder mechanism that supports and controls angular adjustment of the drive shaft 400 in this regard.

A cutting head 410 is supported at a forward end of the drive shaft 400. In this embodiment, a motor, engine, or other drive power-generating 'plant' 420 is disposed at an aft end of the drive shaft 400, with a suitable linkage 400a running through the drive shaft 400 to transfer the torque generated by the drive power plant 420 to the cutting head 410 for responsive rotation of the blade 412 or other cutting implement there. Preferably, one or more suitable automated measures are employed to selectively energize the drive power plant 420, and to adjust the cutting assembly's angular position relative to the support bar assembly 30.

Transfer and conversion of the torque generated by the motor or other drive power plant 420 are carried out by suitable means known in the art. Depending on the embodiment and application, this may include a drive linkage 400a extending through the drive shaft 400 to engage to one or more rotation spindles 414 of the cutting head 410. Each rotation spindle 414 extends transversely outward in relation to the driving linkage 400a to which it is engaged via a suitable transfer gearing interface (employing for instance a plurality of mutually engaged toothed gear wheels). Examples of suitable drive linkages 400a which may be employed include (without limitation) an endless drive belt that may be looped appropriately to grip and turn the cutting head's rotation spindle 414 in response to the drive power imparted to the belt by a motor.

Figure 3:
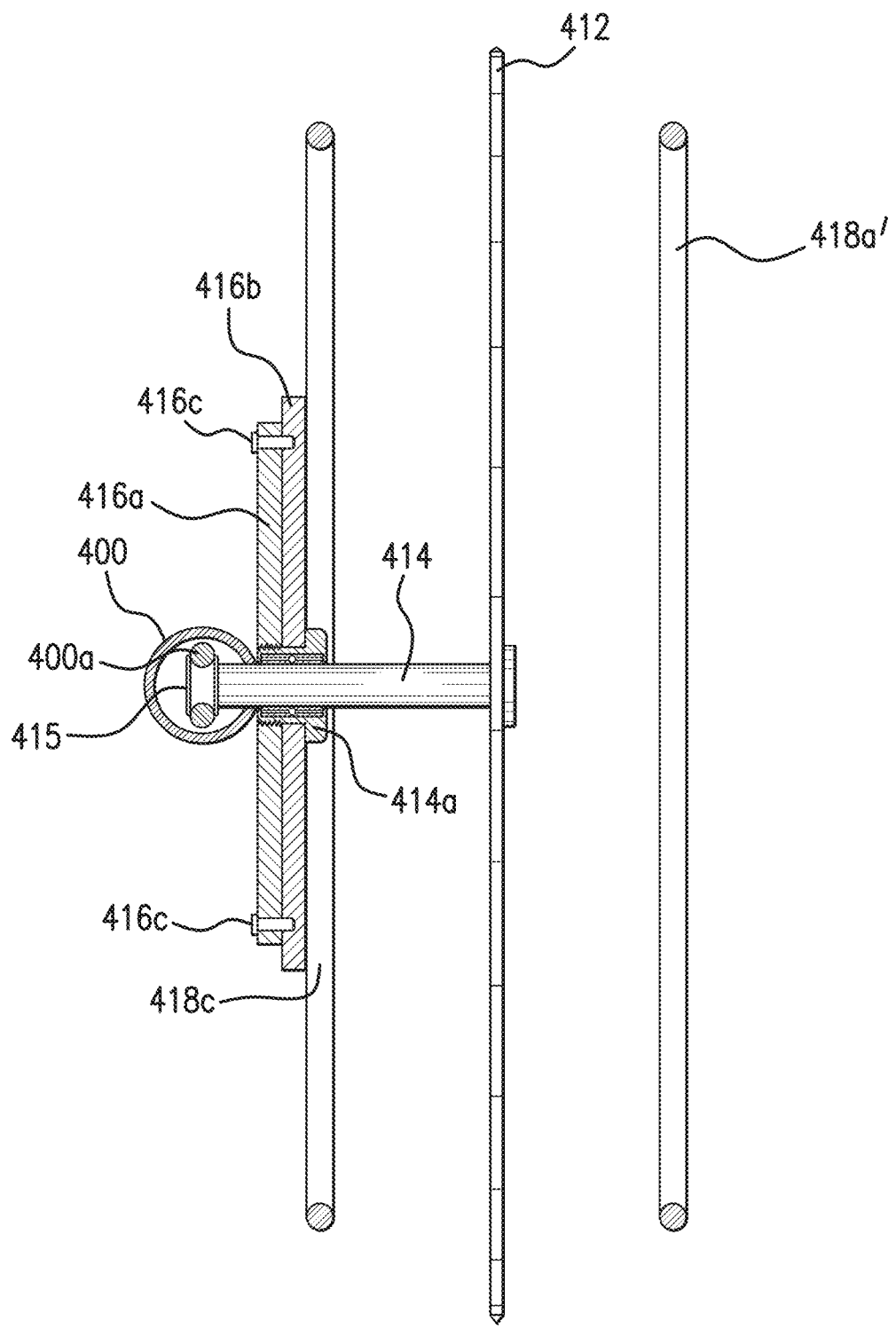
FIG. 3 is a partial sectional view of the cutting head portion of the embodiment of FIG. 1.

The partial sectional view of FIG. 3 illustrates an exemplary embodiment wherein a drive belt linkage 400a is employed in this manner extending longitudinally through the drive shaft 400 (which serves as a housing therefor) to loop around a pulley 415 formed at one end of the cutting head's spindle 414. The drive shaft 400 is fixedly mounted on a support plate 416a as shown, through a bearing collar 414a. The spindle 414 is thereby driven to rotate about its axis by the drive belt's turning of its pulley 415. The spindle 414 thus turns freely within the bearing collar 414a through which it coaxially passes. Meanwhile, the bearing collar 414a is fixedly secured to the support plate 416a, with a backing/mounting plate 416b for the cutting head's frame structure 418 being angularly adjustable about that bearing collar 414a, relative to the support plate 416a. One or more locking pins 416c are employed to releasably lock the backing/mounting plate 416b at a selected angular position with respect to the support plate 416a. The frame structure 418 in this embodiment may then be turned thereby in its angular position about the axis of the spindle 414 and blade 412, so as to adjust the cutting path direction through which the tree limbs or other vegetation to be cut are guided into the cutting blade.

The cutting head's frame structure 418 is provided to serve a number of functions for the blade(s) 412 and its other cutting mechanisms. Depending on the embodiment and application, the frame structure 418 may take on various configurations. Among other things, the frame structure 418 is preferably configured to provide a protective cage-like structure about cutting mechanisms like the one or more circular blades 412 and rotation spindle(s) 414 illustrated in this embodiment, to keep stray limbs and other foreign obstacles away from unintended contact with such cutting mechanisms. The frame structure 418 also includes one or more stop bars 418a, 418a' to limit a tree limb's radial advancement across a blade during a cutting operation. This serves to keep the limb away from the spindle 414 and other vulnerable cutting mechanisms disposed at or near the blade's central turning axis. In the embodiment illustrated, both a forward stop bar 418a and an aft (or rearward) stop bar 418a' are employed to guard against excessive radial encroachment of the limbs being cut from either frontal attack or rear attack directions.

Figure 1:
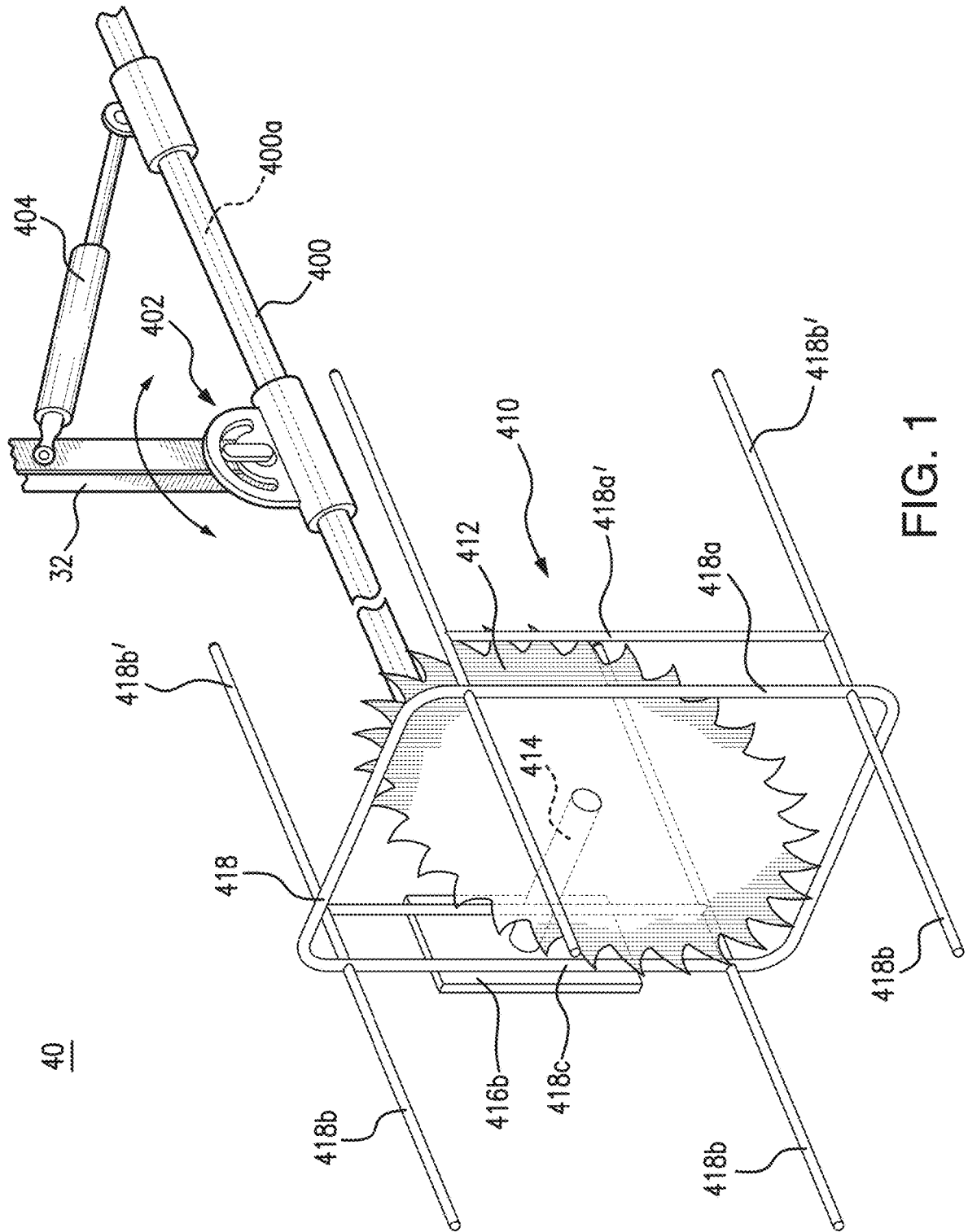
FIG. 1 is a perspective view, partially cut away, of a cutting assembly suspended from a support assembly of an apparatus formed in accordance with one exemplary embodiment of the present invention.
Figure 1A:
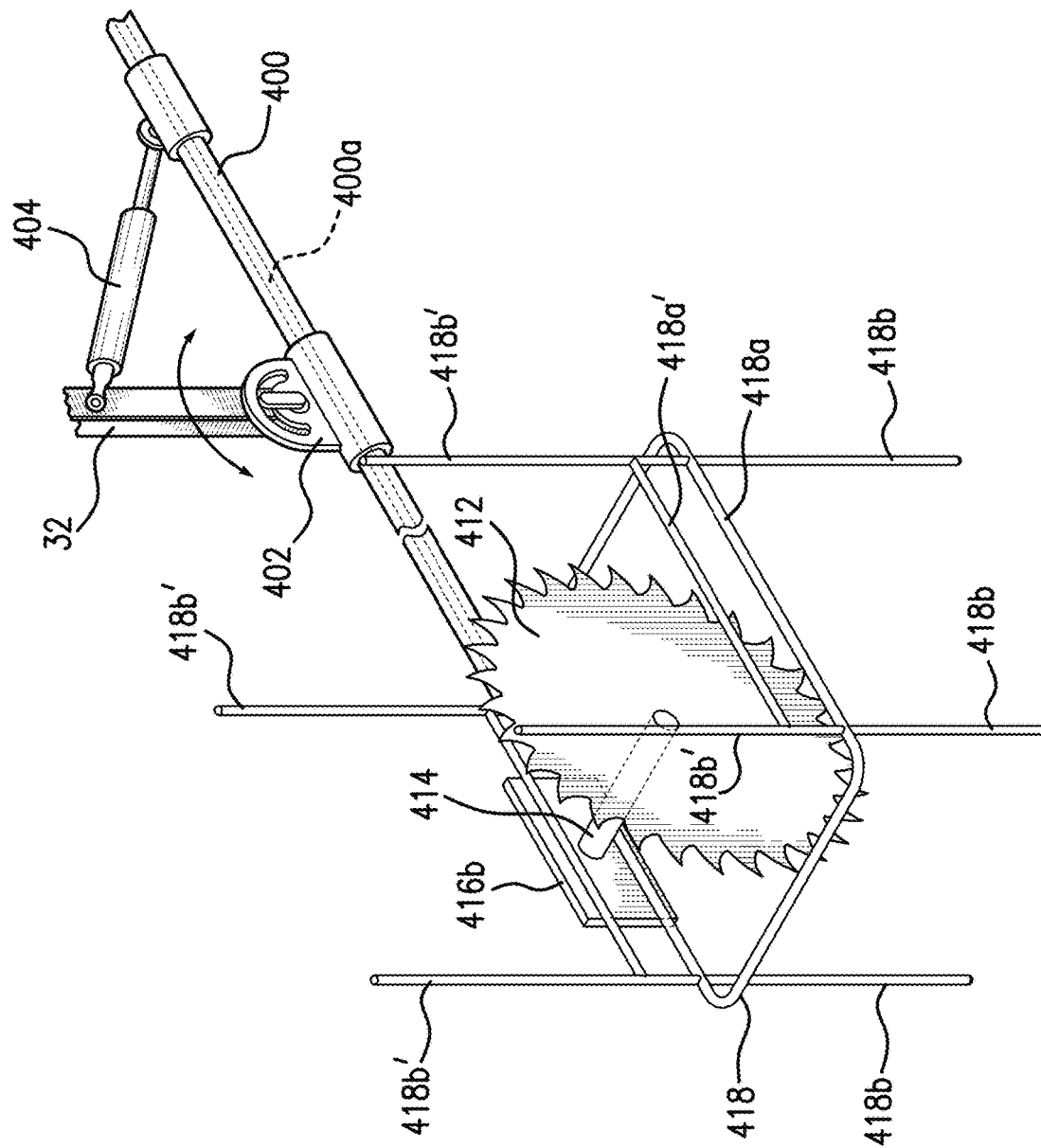
FIG. 1A is a perspective view, partially cut away, of the cutting assembly portion in the embodiment of FIG. 1, illustrating a cutting head adjusted to a different angular position.
Figure 2:
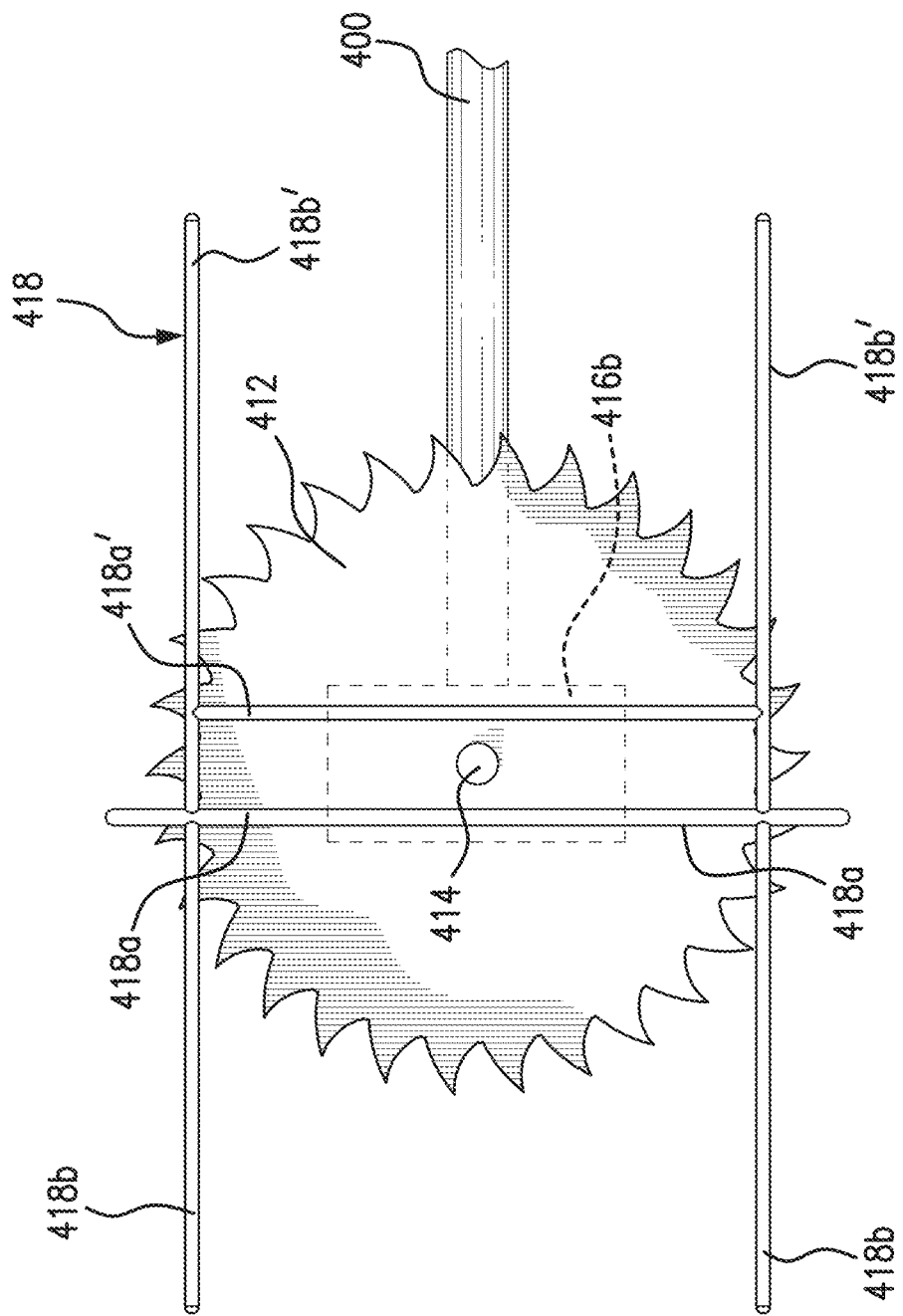
FIG. 2 is a side elevational view, partially cut away, of the cutting head portion of the embodiment of FIG. 1.
Figure 2A:
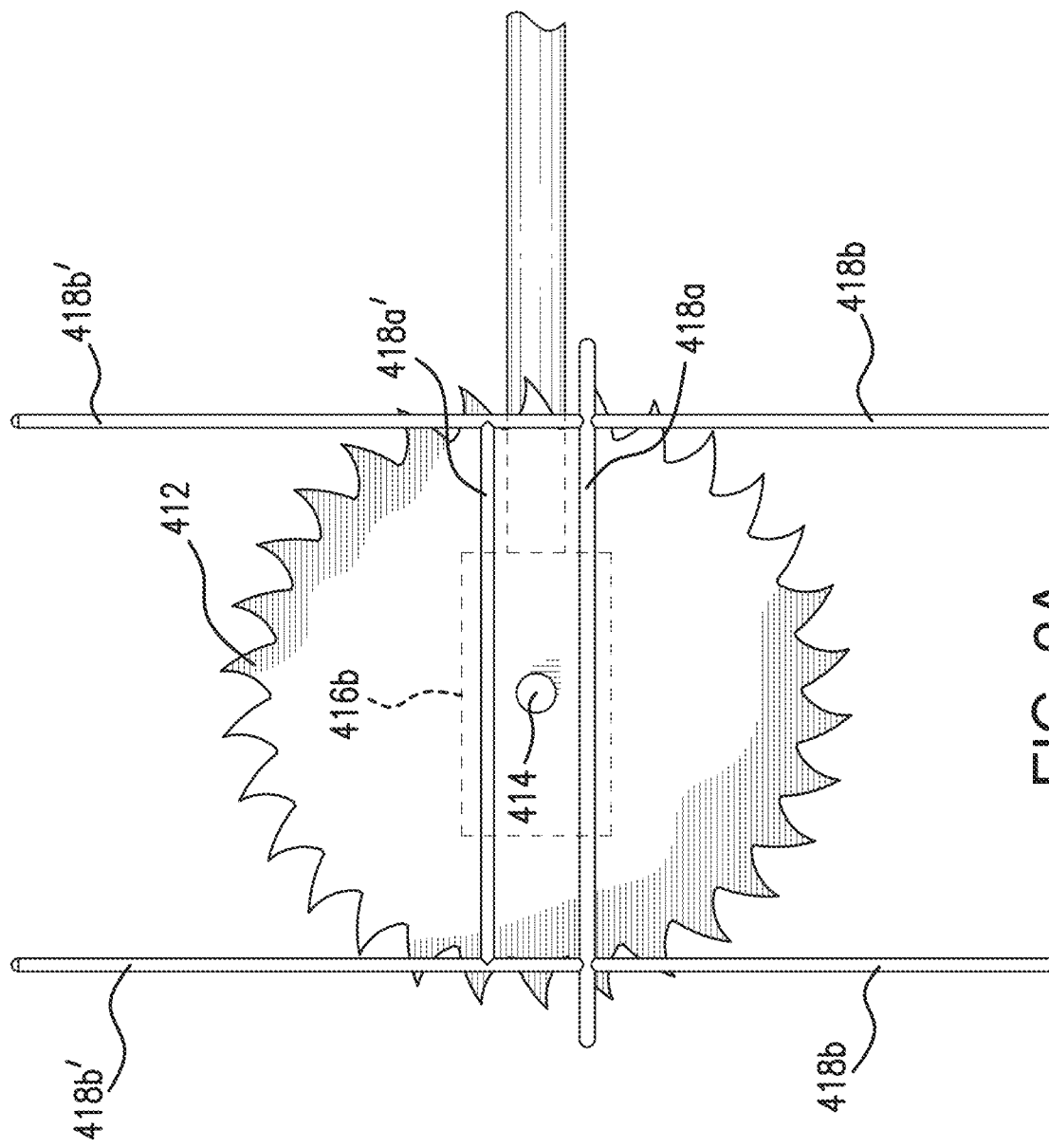
FIG. 2A is a side elevational view, partially cut away, of the cutting head portion of the embodiment of FIG. 1, with the cutting head adjusted to the angular position illustrated in FIG. 1A.

The frame structure 418 also includes a plurality of guide prongs 418b, 418b' which extend transversely from the stop bars 418a, 418a', and which are spaced apart to define a cutting path into which the tree limbs to be cut are received and directed to the spinning blade 412. In the embodiment shown, a plurality of guide prongs 418b, 418b' are formed to extend from one or more of the front and rear stop bars 418a, 418a'. The rear guide prongs 418b', or the rear stop bar(s) 418a', may not be needed or desired in those embodiments and applications where the cutting assembly is employed only with the drive shaft 400 oriented at or near parallel alignment with the guide prongs 418b (such as shown in FIG. 2), where the drive shaft 400 and even the motor 420 itself may prevent ample clearance to provide a safe rear cutting path into the spinning blade 412 anyways. In contrast, where a rear cutting path may be safely provided for—such as with the cutting head 410 angularly adjusted so that the drive shaft 400 is disposed at or near a normal orientation, and thereby transversely directed to stay substantially clear of the rear cutting path—the rear stop bar(s) 418a' may be needed and desired.

Figure 9:
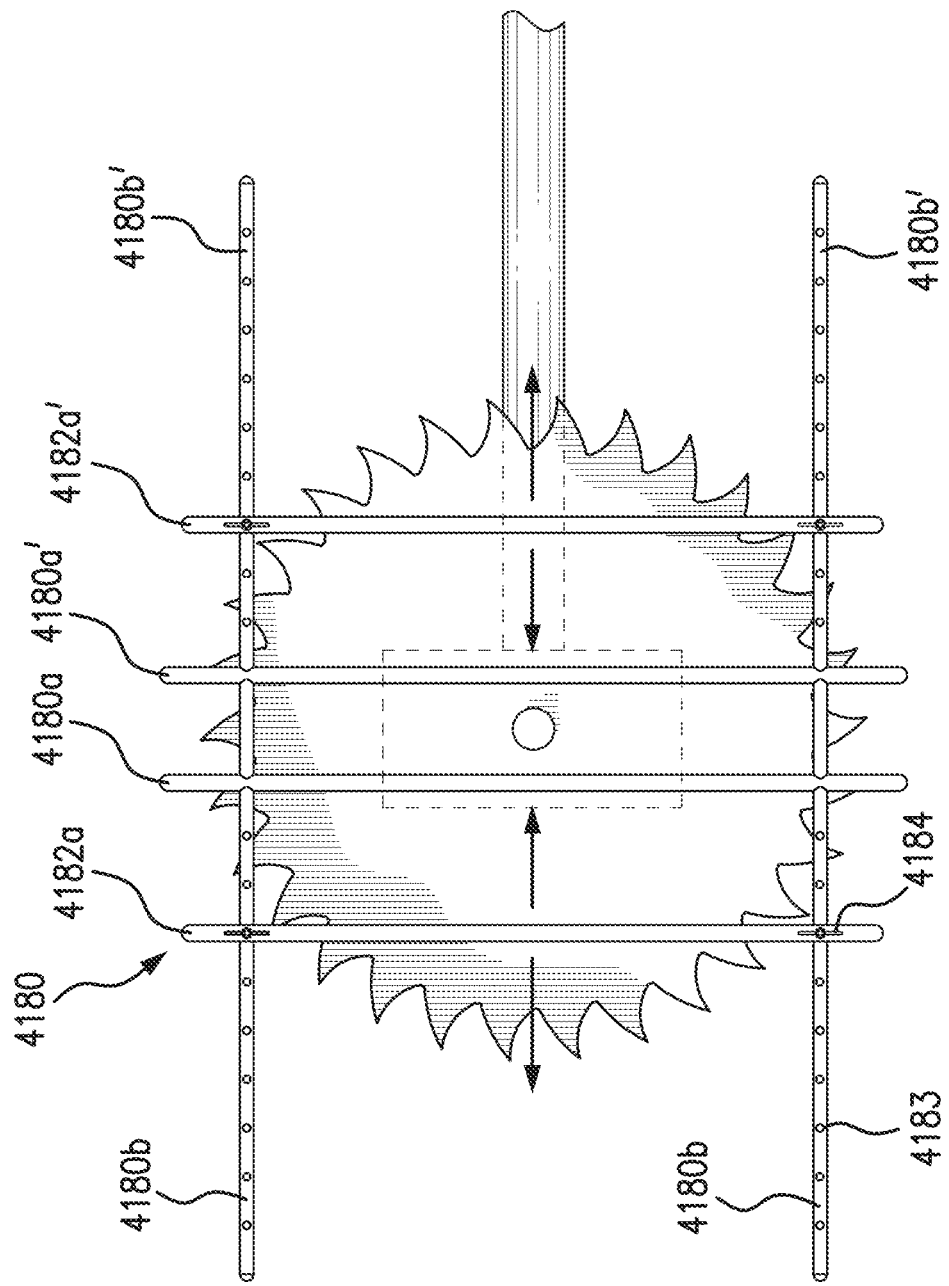
FIG. 9 is a side elevational view, partially cut away, of a cutting head of an apparatus formed in accordance with another alternate embodiment of the present invention, illustrating adjustment of a reconfigurable guide frame structure of the cutting head.

In certain embodiments, such as illustrated in FIG. 9, for example, one or more stop bar 4180a, 4182a, 4180a', 4182a' planes (each "plane" being defined by axially offset but radially aligned pairs of stop bars) may be adjustably provided on the frame structure 4180. In the alternate embodiment of FIG. 9, for instance, multiple planes of stop bars are provided at both the front and rear cutting path sides of blade center. Only one stop bar plane may be provided in certain other embodiments at one or both of the front and rear cutting path sides of blade center. In the illustrated embodiment, front and rear fixed stop bars 4180a, 4180a' (or planes) are provided about the cutting blade's central axis. In addition, an adjustable stop bar (or guarding bar) 4182a, 4182a' is displaceably provided along suitable guide prongs 4180b, 4180b'. In this regard, the guide prongs 4180b, 4180b' may be provided with adjustment holes 4183 formed at different positional settings along their lengths. The guarding bar 4182a, 4182a' may be equipped with a thumb screw, tightening nut, or other releasable fastening measure 4184 for locking the guarding bar 4182a, 4182a' in place at a selected position along the guide prongs 4180b, 4180b', as indicated by the directional arrows. A similar configuration of fixed and adjustable stop bars may be provided for one or both of the front and rear cutting path sides of the cutting head to adapt the subject apparatus for different cutting applications.

Turing back to FIGS. 1-6, the cutting blade is preferably equipped with a protective guide frame structure 418 which serves combined purposes. In the illustrated embodiment, this guide frame structure 418 is formed with an open cage-type configuration that includes a base member 418*c* secured to a base plate 416*b*. The base member 418*c* extends over and about the cutting blade 412 leaving sufficient clearance to avoid interfering with its cutting path. A plurality of guide prong members 418*b*, 418*b*' in this embodiment project from the base member 418*c* in the forward (fore) and rearward (aft) directions. Upper and lower guide prong members 418*b*, 418*b*' collectively serve to guide a tree limb to be trimmed properly into and transversely across the blade's cutting path. Adjacent guide prong members 418*b*, 418*b*' disposed at the same side of the cutting blade spindle 414 are provided with a stop/blocking member 418*a*, 418*a*' extending therebetween, which serves to stop a tree limb guided into the blade's cutting path from advancing beyond a predetermined central region of the blade. As noted the stop/blocking members 418*a*, 418*a*' thus serve to protect the central spindle portions 414 of the spinning blade 412 from obstructive or destructive interference by the tree limb.

In the illustrated embodiment, four protective guide prong members 418*b*, 418*b*' extend out from the base member 418*c*. In addition to serving as positioning guides for the tree limbs into the blade's cutting path, the prong members 418*b*, 418*b*' serve also as retention guards against the effects of kick back force when the teeth of the spinning blade 412 initially contact a tree limb. Upon hitting a limb, the cutting assembly 40 would initially kick back, reactively recoiling to swing away, against the direction of spin. One or more of the guide prong members 418*b*, 418*b*' would then swing against the tree limb to block further recoiling of the cutting assembly 40. Cutting may thereafter resume once the teeth engage the tree limb enough to grip and break into its surface. The fore- and aft-directed guide prong members 418*b*, 418*b*' serve these guiding and protecting functions for tree limbs engaged for cutting, respectively, at the fore- and aft-edges of the cutting blade 412.

Regarding their guiding function, when mutually opposed guide prong members 418*b*, 418*b*' catch and retain a limb therebetween, cutting is assured upon further advancement of the cutting assembly 40 toward the limb. This means the operator need not maneuver the drone to position the cutting assembly 40 on target exactly. A reasonable degree of operational 'slack' may be afforded, meaning that the assembly's cutting head 410 may actually be placed a predetermined distance (say about a foot or so) off target, yet still catch that limb for effective cutting.

Preferably, the guide frame structure 418 and its members are fixedly coupled against displacement relative to the cutting blade 412, such that it moves and tilts with the blade as it spins to maintain a consistent protective guiding structure thereabout, at all different cutting positions. The guide frame structure's dimensional features, shapes, relative spacing, and the like may be suitably varied depending on the particular needs of the intended application.

During typical trimming operations, corresponding guide prong members 418*b*, 418*b*' (which cooperatively guide a tree limb into the cutting path at one edge of the blade) are preferably separated by a distance almost as wide as the blade's diameter. This ensures that a substantial portion of the guided tree limb actually makes contact with the blade edge upon advancement up to the blocking member of the guide frame structure 418.

The cutting head portion 410 of the cutting assembly 40 is driven preferably through a rotation gearing and transmission coupling to the power plant portion 420, which may be of any suitable type and configuration known in the art. In the illustrated embodiment, a drive shaft linkage or drive belt 400*a* driven by the power plant portion 420 extends through the longitudinally extended arm portion 400. The drive shaft linkage or belt 400*a* transfers a torque generated by the power plant 420 to the cutting head portion 410, which is suitably equipped with a responsively rotatable spindle 414 to which the cutting blade 412 is coaxially coupled.

As shown in the embodiment illustrated in FIGS. 1-6, a frame structure 418 is coupled at the cutting end of the cutting head 410 preferably in pivotally displaceable manner A plurality of guide prongs 418*b*, 418*b*' are formed to extend from the frame structure 418 to form a cage-like guide frame about the cutting blade. Where the angle of attack is horizontally directed generally into the branches to be cut, the guide prongs 418*b*, 418*b*' are likewise horizontally oriented relative to the branches. Conversely, where the angle of attack is vertically directed generally onto the branches (typically from atop), the guide prongs are likewise vertically oriented.

Pivotal adjustment of the frame structure 418, hence the guide frame it defines, allows for the angle of attack to be offset in angular orientation from the axial direction of the cutting assembly's drive shaft 400. In certain situations, it may be more convenient to provide a vertical angle of attack for cutting, for example, without having to unduly tilt the drive shaft 400 away from a horizontal position towards a vertical position. In other situations, the vegetation may be sufficiently thick or confining that it may be necessary to execute a cut at a horizontal angle of attack, though with the drive shaft 400 held at or near a vertical orientation. The guide frame's pivotal adjustability with respect to the drive shaft 400, as shown, makes for wide adaptability to various cutting situations—as the guide frame 418 need not remain aligned with the axis of the cutting assembly's drive shaft 400.

Towards that end, a suitable rotation gear or other pivotal adjustment measures known in the art is preferably employed at the coupling interface between the cutting head 410 and drive shaft 400 of the cutting assembly 40. As illustrated in FIG. 3, the guide frame 418 may be mounted or otherwise formed to extend from a base plate 416*b* which is coupled to a support plate 416*a* on which the cutting head 410 is mounted. One or more retractable/releasable locking pins 416*c* lock the base plate 426*b* to the support plate 416*a* in one of a plurality of predetermined angular positions relative to that support plate 416*a* (such as the vertical and horizontal position, among others).

With cutting device having a cutting head 410 longitudinally offset from a motor and control plant by a drive shaft 400, one of the simplest configurations is to take the whole cutting device and support it in the middle, then just rotate the whole device instead of a portion of the device. It would ordinarily make for a very tricky coupling if one had to turn the cutting head 410 and hold the motor stationary. The interconnections would require a transmission or other such measures to allow for that motion of the cutting head part relative to the drive shaft.

The cutting equipment's motor (power plant) 420 may be of any suitable type known in the art, including those driven by gasoline or electric power. If it is gasoline powered, protective measures may be needed against gasoline leakage due to all the vibration, shaking, and displacement that may be encountered during typical use.

That option may be nonetheless preferred in many applications because of the prevalent devices currently known in the art which afford desirable combination of cutting power and run time capacity. With the growing efficiency and capability of battery and other alternative power sources, this may change in coming years. Cutting equipment and its related controls powered by any suitable power source known in the art may be employed by the subject apparatus.

Regardless of power source, an articulating head where the head swivels or otherwise displaces relative to the rest of the cutting equipment, and without the motor or engine having to turn with it, complicates the structure. That is, assuming that the leakage of the gas is not a problem, gravity is not an issue, and if the whole cutting device including the motor could be turned safely upside down, that would provide maximum flexibility of use. However, if one had to worry about gravity on the motor or engine end, a suitable articulating head coupling may be employed to allow for the rotation about the body of the machine.

Preferably, the cutting head articulates between 180° or 90° angular positions, so the cutting operation may occur straight across or up and down while in the air, depending on the application.

Employing a weedwacker-type device, where a spindle turns on a shaft is also an option. In such cases, the spindle's axis of rotation and the shaft are substantially aligned. But when a circular rotating cutting blade is employed, the axis of rotation of the cutting blade may be at or near perpendicular to the drive shaft. So the whole cutting device including the motor or engine, may be tilted to about 90° or 180° in position for different dimensional cutting. The change in orientation would facilitate branches extending at a range of different orientations between straight horizontal and straight vertical.

Orientation of the cutting blade(s), or the cutting plane, may be controlled by manipulating all or part of the cutting equipment to ideally make a nearly square cut. Saws of various types known in the art, such as the so-called boom saws, employ circular beds typically having circular blades held on a fiberglass pole which may be for example about 70 feet in length and about 2 feet in diameter for heavy duty cutting applications. When a saw blade touches a limb, the limb flies off quickly. Applying such saw blades to the subject apparatus, the blades may be formed of strong materials known in the art such as titanium or graphite to minimize weight. For example, if a graphite material were used with carbide tips on the blade, the saw blade weight could be drastically reduced, perhaps by as much as a half. It is preferable to optimize performance by lowering the weight as much as possible.

Drones known in the art are sufficiently powerful now, and equipped with sufficient navigational capabilities that they are able to provide pinpoint control and accuracy of prescribed flight. Flight control is sophisticated enough to keep from flying into trees and other obstacles. In a typical application, for example, the drone may stop midair, fly up 25 feet, then continue on flying. When it 'sees' a tree, it moves up another 25 feet, and moves on. When the user hits a button for return to home, or to a marked/designated location, it may return and land at the spot that it took off from.

Range may vary with the drone and its power/fuel capacity. Preferably, a drone employed for use in the subject apparatus would have protective measures whereby if it is about to get out of range, it knows to return home by itself. Or, if it becomes low on battery for whatever reason, it returns home by itself.

Turning to the suspension assembly, the one or more suspension rods 32 used with the drone may be subject to kickback forces. Suitable measures are employed to account for such operational factors.

The subject apparatus overcomes the disadvantages of conventional approaches to trimming high forest limbs not easily reached by ground or from the ground, which may cost on the order of $15,000.00 to rent a helicopter for a day. When there are mountains to go over top of and a helicopter equipped with a bubble and legs on it may be employed, equipped with a rod hanging down about 120 feet, with sawblades 30 feet long. Typically, a big 'box' is equipped with a hydraulic motor, which the helicopter carries flying down the side of the mountains where it is very steep. The helicopter suspends the bubble and the pilot reaches out of the cabin window to look below while flying forward and backward—to perform helicopter tree trimming.

The subject apparatus preferably encompasses the option of having multiple blades perhaps with multiple rods to get a bigger cut if needed. The resulting cutting head may be reconfigured accordingly for optimal cutting, so it draws the limbs effectively by suction into the middle then blows them out when cut.

One example of a multi-blade embodiment of a cutting head 4100 is illustrated in FIGS. 7-8B. In this embodiment, a plurality of cutting blades 4120*a*, 4120*b*, 4120*c* are coupled by respective spindles 4140*a*, 4140*b*, 4140*c* to spin with respect to the base plate 4160 to which the drive shaft 4000 is secured. Preferably, a drive belt linkage (such as illustrated in FIG. 3) is run through the drive shaft 4000, driven by a motor or engine to turn each of the blades' spindles 4140*a*-4140*c* during a cutting operation. The multiple blades 4120*a*-4120*c* may be spaced and positioned relative to one another in any manner suitable for the particularly intended application. In the configuration shown, the blades 4120*a*-4120*c* are arranged to be substantially aligned longitudinally along the base plate, with adjacent blades slightly overlapping (longitudinally) to avoid or minimize possible gaps in the cutting swath collectively defined by the blades 4120*a*-4120*c*. To avoid destructive interference between adjacent blades, the middle blade 4120*b* is slightly offset axially relative to the outer blades 4120*a*, 4120*c* in the configuration shown.

Figure 8A:
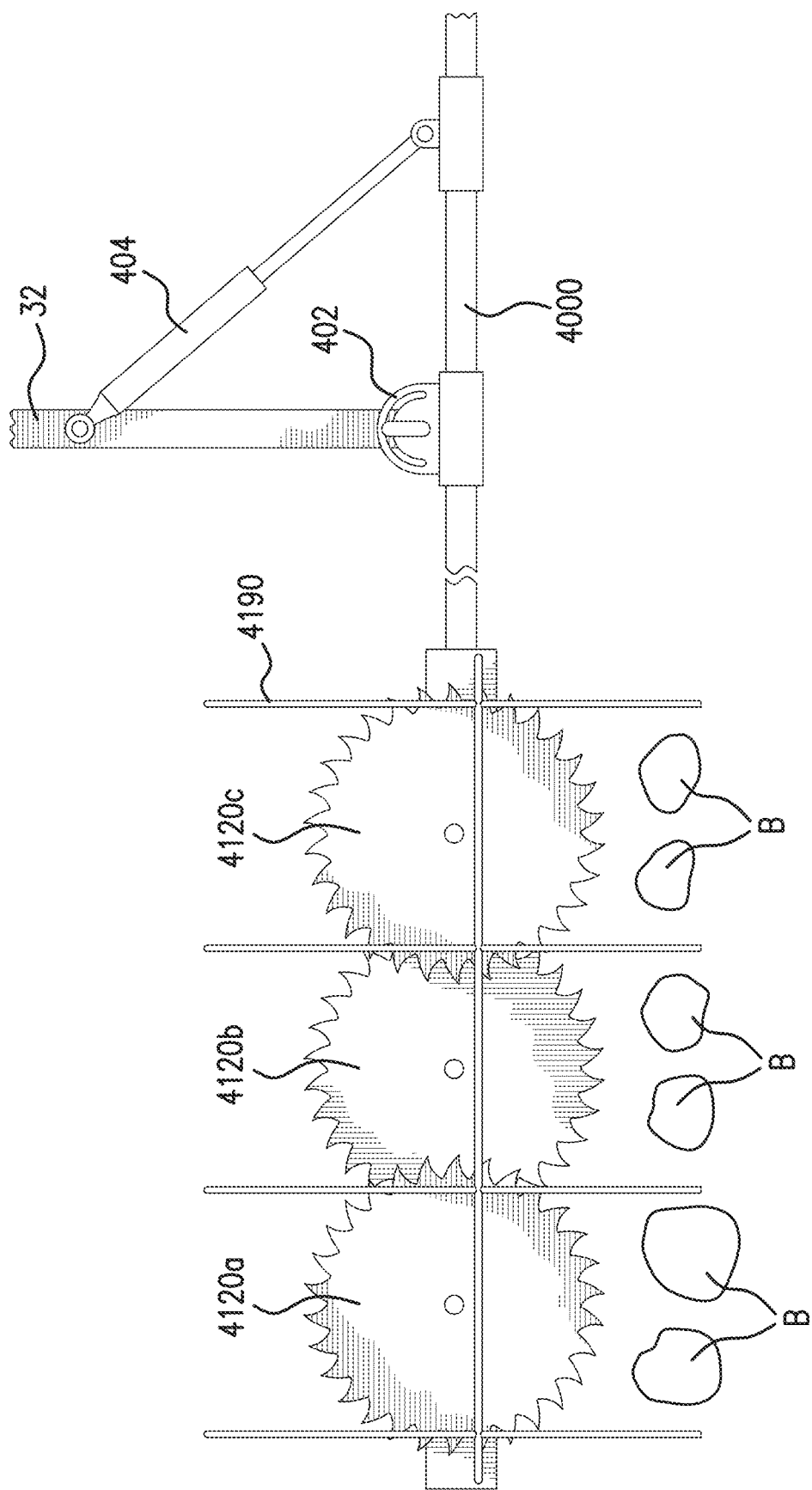
FIG. 8A is a side elevational view, partially cut away, of the cutting assembly and support assembly portions in the embodiment of FIG. 7, illustrating the cutting assembly adjusted to a first angular position relative to the support assembly during a trimming operation.

A frame structure 4190 is configured to form a longitudinally extended stop bar 4192 plane that is offset by a slight radial distance relative to the axially centers of the blades 4120*a*-4120*c*. A multi-cutting guide frame is collectively formed about the frame structure 4190 by a plurality of U-shaped guide rod structures 4194*a*-4194*d*. The guide frame also provides a protective cage about the spinning blades 4120*a*-4120*c*, while leaving openings below to define a plurality of cutting 'lanes' through which the tree limbs/branches B to be cut are received and guided to the spinning blades 4120*a*-4120*c*. This is illustrated, for example, in FIGS. 8A and 8B. The angle of attack for these cutting lanes may be selectively adjusted between a substantial downward orientation (for a substantially horizontal cutting swath) as illustrated in FIG. 8A, to a more angled orientation (to define a correspondingly angled cutting swath) as illustrated in FIG. 8B. The concurrent use of multiple cutting blades 4120*a*-4120*c* provides a longitudinally extended cutting swath for more efficient cutting of large trimming areas, typically at the cost of greater load on the output capacity of the given motor, engine or other drive power generating device employed.

The topmost heights of forestry may be reached from atop by cutting equipment dangling off the drone. If one could adequately control the angle and position of the drone 10, the subject apparatus offers enough degrees of freedom to effect a wide range of cuts that may be needed.

One problem is that when relatively little limbs at the top of the trees are cut, they might not fall properly and get stuck in awkward and undesirable positions and places (and remain as 'hangers'). So a suitable hook mechanism or accessory may be provided to reach down there and get all these hangers (meaning branches that have been cut and suspended) out of these trees, because most users don't want to leave residual hangers in trees. Every limb is full of crotches and twigs, and such hook mechanism/accessory simply reaches down and catches the limb so that the drone 10 may be moved to pull it.

Preferably, the drone 10 is equipped with a camera so the user can see what they're doing. The camera would be able to zoom in and out. It would have a suitable look down zoom camera.

There are notable parameters for the drone 10. It should be powerful enough for the expected equipment (that is, have enough payload capacity), and it has to be rugged enough to withstand the jarring and the backlash of these things bouncing around. Whenever a support assembly 30 of any significant length is employed (for example, about 50 feet in length), the leverage of that assembly 30 tends to be great enough to require considerable added force to control the cutting assembly 40 supported at its lower end. That is, a support assembly 30 of about 50 feet length as opposed for instance to an assembly 30 of about 3-10 feet in length adds considerably more sway to account for. So the drone 10 is preferably equipped with a suitably strong, beefy chassis 12 to—along with vehicle power—withstand and dampen such leveraged swaying action.

Depending on the embodiment and application, it may be necessary to equip the drone 10 with a very sturdy cage for instance to be able to securely hold this 50 or 60 foot support bar that is collectively formed for the suspension assembly. The constructed support bar (rod) may have to support about 30 pound or more of cutting equipment 40, which adds up to considerable inertia. During turning maneuvers, the resulting assemblies will need to hold substantially in place relative to the vehicle chassis assembly 12. For every segment 32 of length increase, it becomes harder and harder to hold it in place, not to mention the stability that the drone is going to have to maintain. The drone 10 is preferably programmed to compensate for such factors, as wells as for bounce back/kickback forces that it encounters while in flight. The drone vehicle 10 is strong enough in power output to accommodate powerful countervailing forces—so that it will not be flipped upside down or the like as a result. So a suitably sized and powered drone 10 is employed for the subject apparatus.

For typical tree limb cutting applications, at least 30 pounds of payload capacity may be needed in many applications, along with a strong enough chassis 12 for the drone 10. And the drone 10 may have to sit on a frame, and the frame may have to be made up of sufficiently strong and rigid steel members so that it doesn't deflect when subjected to all these forces from the anticipated use.

Preferably, the support assembly's bar segments 32 are clip or otherwise secured together, with ample overlap between segments. For example, a spring-biased snap button and cover, an insert pin biased to remain inserted in aligned holes of overlapping segments 32, or the like may be employed. For reinforced strength and torque resistance, the support bar segments 32 preferably include rigid beams having angled, or substantially L-shaped, cross sections.

Such angled steel beams or metallic beams that resist excessive twisting are preferably employed. If one employed a flat piece, a relatively thick piece would be required to resist excessive twisting. Depending on the application, it may be advantageous to combine angled L beams with consecutive beams alternating in right or left hand orientations for cross protection against bending and twisting.

Composite materials such as carbon fiber may be desirable for the support bar segments 32 because of their high strength to weight ratio. In addition to carbon fiber rod, titanium or other suitable materials known in the art may be employed which provide sufficient rigidity and strength to support safe and effective cutting operation while suspended from the drone vehicle. As noted, strength is enhanced, preferably, by forming beams with an L-shaped sectional configuration or other strength-augmenting features. Such strength-augmenting features make the beams very rigid in certain dimensions.

The driving motor and gearing sufficient to turn the saw blade 412 are suitably intercoupled so that a trimmer-type cutting tool is formed in the disclosed embodiment, which may be turned upside down and moved with few if any restrictions. The motor 420 provides enough RPMs to turn the saw blade 412 with the power required for cutting the full range of sizes and species for the tree limbs and/or other such vegetation to be trimmed in the particularly intended application. Power may be transferred from the drive motor 420 to the blade, string, or other cutting mechanism employed via a gear drive, belt drive, or hydraulic drive measures. The cutting head 410 may be built for instance to be under 15 pounds, with the heaviest part typically being the saw blade 412. Use of alternate materials (other than a metallic material) like carbon fiber may be made to reduce the resulting weight.

Depending on the application, a certain desirable weight range may be predefined. Maintaining a certain minimum weight preserves the inertia to stabilize the cutting head 410 during cutting operation against a tree limb. It not only provides the inertia to resist de-stabilizing recoil upon cutting impact, it provides the inertia to dampen the free-swinging displacement of the cutting equipment 40 that might otherwise occur in response to abrupt movements of the drone 10.

Examples of saw blades 412 that may be employed include (but are certainly not limited to) blades having a 10 inch radius from center, which weigh about 2 pounds, capable of making up to 5 inch cuts.

The recoiling kickback may very well exert more force upon the cutting equipment 40 (and its suspension assembly 30) than the inertial effects on and due to the dangling weight thereof. In view of such kickback, a protective rod/guard is employed across and about at least a portion of the blade, to help contain the situation if excessive kickback were to occur. For example, a protective rod/guard may be provided across the top of the blade spaced from contact therewith. This would prevent tree limbs, for instance, from making it past the top of the blades. Also, the saw blade may be provided with a center guard radially offset in front of the blade to limit the amount of cut (so that the tree limb does not reach the center driving spindle mechanism for the blade). That way, if a tree limb were to kick in by force of the rotating blade towards its center spindle mechanism, it will only kick into the guard. Typically, one is only looking for a maximum of about a 6" cut. In other words, a 6" cut is considered a big limb in most tree trimming applications. When the vehicle flies up then drops down in flight to lower the cutting head down on the limbs below, the blades tend to seemingly blow the limbs off upon contact because the blades are spinning so fast—typically on the order of about 3000 rpm's.

Preferably, a cutting blade 412 is extended laterally from the drive shaft by its spindle mechanism 414. This spindle mechanism 414 is of sufficient length such that the cutting blade's cutting plane is suspended out away from the support structure (drive shaft 400 of the cutting equipment 40) for ample access to the branches, which sometimes require the cutting head 410 to reach in considerably through the thicket of leaves and other vegetation for cutting a limb to optimum cutting length.

Such optimum cutting length would vary with application. But the reach of the cutting head 410 may be, for example, on the order of about 6 feet out, away from the suspension assembly 30 intermediately coupled to the drive shaft 400, with the cutting head 410 being suitably counterbalanced by the motor assembly 420 on an opposing end of the drive shaft 400. The cutting head 410 in most tree trimming applications should then get down into the trees enough to make acceptable trimming cuts while keeping the motor safely above or otherwise spaced away from the hazards of the trees' dense thickets.

Preferably, some adjustability is provided, with for instance a telescopic coupling. This would contribute to multiple degrees of freedom for adjustment, including two or more angular adjustments and at least one linear adjustment.

Also, if the apparatus is to permit adjustments out to about 6 feet of clearance to provide cutting head 410 reach, it needs to provide ample counterbalancing to preserve stability. In certain embodiments and applications, the counterbalancing may also be controlled adjustment. For example, the drive shaft 400 portions at the opposing side of the suspension assembly 30 may be linearly extended or retracted between a range of longitudinal lengths (such as between 3 to 6 feet). The idea is to avoid destabilizing the apparatus, and keeping it substantially balanced at all times.

In a simple example, the user may effect such adjustment by loosening an adjustment nut and sliding the motor side of the drive shaft 400 out two feet, then loosening a corresponding adjustment nut at the cutting head end of the drive shaft 400, sliding that side of the drive shaft 400 out two feet. The resulting structure would then be balanced about the suspension bar 30 to which the drive shaft 400 is intermediately coupled.

This type of adjustment and reconfiguration may also be automated. In very elaborate embodiments, measures may be provided to account for those situations, for example, where most cutting occurs at a consistent cutting reach setting (say about 4 feet length setting) but with a few limbs requiring deviation from that consistent setting. Automated adjustment employed in that situation would preferably allow for adjustment on the fly, or very nearly on the fly, so that one need not altogether stop operation to reconfigure the apparatus. One would simply need to actuate an automatic reconfiguration button or other control for instance cause a piston to extend a telescoped portion out or draw the portion back in.

Figure 13:
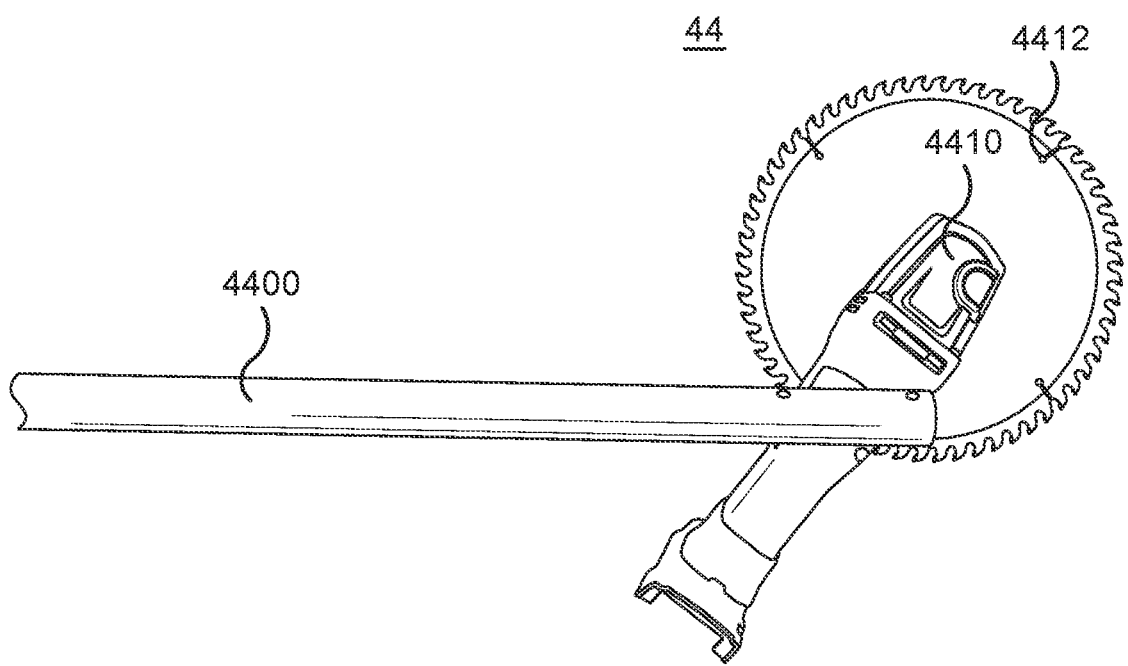
FIG. 13 is an elevational view of a cutting assembly of an apparatus formed in accordance with still another alternate embodiment of the present invention, illustrating a cutting assembly with the drive power plant substantially co-located with a cutting head, and a frame structure and guide frame not shown for clarity and simplicity of disclosure; and, FIG. 14 is an elevational view of the cutting assembly of FIG. 13, illustrating the cutting assembly disposed at a different angular position with respect to a drive shaft/arm portion, and the frame structure and guide frame again not shown for clarity and simplicity of disclosure.
Figure 14:
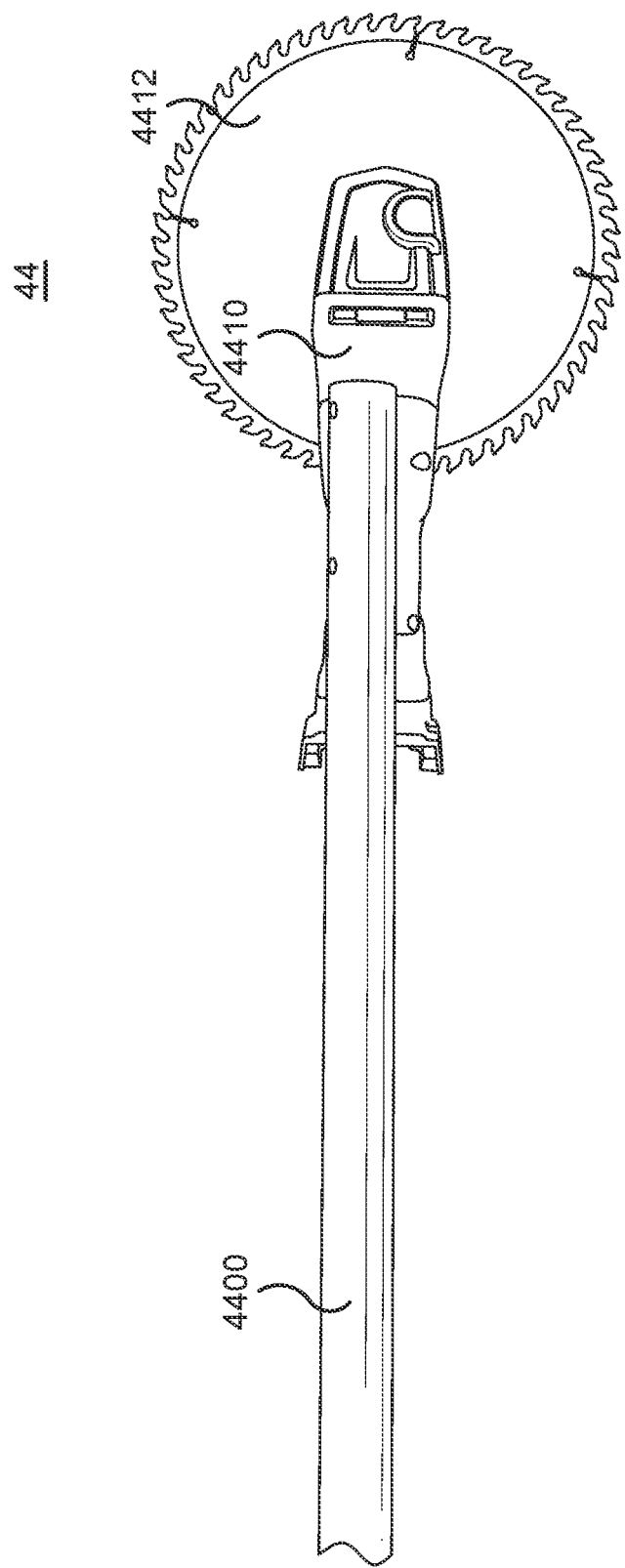

Referring to FIGS. 13-14, a cutting head and drive or power source that may be employed in another embodiment of the cutting assembly 44 are not displaced from one another to be positioned at/near different ends of a drive shaft 4400, as in the preceding embodiments. Rather, the cutting head and power source are effectively co-located as part of a composite cutting tool device 4410 which forms the cutting head at a distal end of the 'drive' shaft 4400. In this embodiment the 'drive' shaft 4400 would not actually serve as a driving shaft per se, since the powered drive mechanism is co-located with the driven cutting blade, and need not be coupled intermediately by a mechanical linkage which normally typifies a drive shaft. For further discussion of this embodiment, therefore, the 'drive' shaft 4400 is more generally referred to as an extension arm, or arm, portion 4400.

As illustrated in FIGS. 13-14, the composite cutting tool 4410 is preferably coupled at or near the terminal end of the extension arm portion 4400 in angularly and/or linearly adjustable manner relative to that arm portion 4400. In FIG. 13, for instance, the composite cutting tool 4410 is adjusted in angular position such that the transverse axis of rotation of its cutting blade 4412 is drawn away from a longitudinal axis of the arm portion by certain predetermined degree. In FIG. 14, the composite cutting tool 4410 is adjusted in angular position such that the transverse axis of rotation of its cutting blade 4412 is disposed in line with (to effectively cross) the longitudinal axis of the arm portion. With suitable measures to releasably lock the composite cutting tool 4412 to the extension arm portion 4400 in various cutting positions (between which it may be adjusted), the system may adaptively position the blade's cutting edge with respect to the extension arm 4400 portion to maintain optimal cutting conditions during use.

The cutting tool 4410 in this embodiment is largely self-contained with motor and battery or other suitable power source locally provided therein. The cutting tool 4410 may be of any suitable type known in the art for portable or near-portable cutting operations. In certain variations of the embodiment, a main or supplemental power source may be disposed at an opposing end of the 'drive' shaft 4400 for balanced positioning of the same. A conductive or other power transmission link may be conveniently provided through the 'drive' shaft 4400 in that case to the cutting tool.

For various embodiments and applications, certain emergency measures may be incorporated into the subject apparatus as needed. In addition to suitable measures for remotely controlled angular displacement of the cutting assembly 40 relative to the support assembly 30 (which may be provided in the boom-like housing for the motor/engine/drive power such as illustrated for instance in FIG. 4), suitable remotely controlled measures may also be provided for quick release of the cutting assembly 40 from the support assembly 30. For example, in highly remote areas where the risk of injury due to falling debris to persons or property below is virtually non-existent, suitable remotely controlled measures are preferably provided to effect a quick disconnect in the event that the cutting blades 412 get pinched or otherwise jammed by a tree limb or other structure, and cannot be freed/extricated from the situation.

A quick disconnect at that point would free the drone vehicle 10 along with much of the attached suspension assembly 30 for return to base. Arrangements may be made thereafter to recover the stuck cutting equipment 40 left behind. This quick disconnect feature may be employed by any suitable means known in the art preferably at a point of interconnection between the cutting assembly 40 and support assembly 30 (the remotely releasable coupling pin, for instance). Alternatively, such quick disconnect feature may be implemented at one or more of the pin-secured joints between support bar segments 320a, 320b of the support assembly 300 shown in the embodiment of FIGS. 10-12. In such embodiments, a securement pin 326 may be automatically withdrawn from its securing position to release one or more support bar segments 320a, 320b from its joint coupling with another support bar segment 320a, 320b or pivoting stem 322 overhead.

Given the inherent hazard of leaving heavy cutting hardware hanging dangerously overhead near high, largely unreachable tree tops, other suitable measures are preferably also incorporated to offset the hazard. For example, emergency hook or anchor members tethered to the cutting equipment 40 may also be deployed in the event of such emergency situations. These hook or anchor members would engage surrounding branches or other vegetation to keep the cutting equipment 40 from falling freely to the ground.

Although this invention has been described in connection with specific forms and embodiments thereof, it will be appreciated that various modifications other than those discussed above may be resorted to without departing from the spirit or scope of the invention as defined herein. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined herein.

What is claimed is:

1. A system for unmanned aerial vegetation trimming comprising:
    an aerial vehicle configured for selectively controlled unmanned flight over and about the vegetation to be trimmed;
    a cutting assembly including an adjustable cutting head selectively actuated for trimming the vegetation, said cutting assembly further including a longitudinally extended arm portion, and a powered driving source, said cutting head being adjustably disposed on said arm portion for optimal positioning, said cutting head including a cutting blade rotatably driven by said powered driving source, said cutting head including a frame structure disposed protectively about said cutting blade, said frame structure including a plurality of guide members spaced apart from one another to guide a vegetation limb transversely into a cutting path of said cutting blade during trimming; and
    a support assembly coupled to said aerial vehicle and said longitudinally extended arm portion, said support assembly being selectively extendable or retractable to suspend said cutting assembly a predetermined distance from said aerial vehicle, said support assembly being configured to angularly adjustably position said cutting assembly relative thereto to trim the vegetation.

2. The system as recited in claim 1, further comprising a remote control unit, said remote control unit being wirelessly coupled to said aerial vehicle, said aerial vehicle being a drone remotely piloted by said remote control unit.

3. The system as recited in claim 1, wherein said coupling between said longitudinally extended arm portion and said support assembly is an angularly adjustable coupling.

4. The system as recited in claim 1 wherein an adjustment of said cutting head is an angularly displaceable adjustment to adjust a position of said cutting blade for said optimal positioning.

5. The system as recited in claim 1, wherein said support assembly includes a plurality of support bar segments coupled to one another substantially aligned in length, each said support bar segment being formed with an angular cross-sectional contour.

6. The system as recited in claim 1, wherein said arm portion includes first and second terminal ends and an intermediate section extending longitudinally therebetween, said cutting head and powered driving source being disposed respectively at said first and second terminal ends and intercoupled by a drive linkage passing through said intermediate section of said arm portion for transferring force generated by said powered driving source to said cutting head.

7. The system as recited in claim 6, wherein said arm portion is coupled to said support assembly at said intermediate section by a tilting mechanism and a stabilizing arm, said tilting mechanism adjustably supporting said arm portion to be displaceable between a plurality of angular positions relative to said support assembly, said stabilizing arm remaining pivotally coupled to one of said support assembly and said arm portion and pivotally coupled to the other for adaptively maintaining cross bracing support therebetween.

8. The system as recited in claim 1, wherein said aerial vehicle includes a chassis assembly and a flexible link coupling said support assembly to said chassis assembly, said chassis assembly displaces said flexible link which in turn extends or retracts said support assembly with respect to said chassis assembly.

* * * * *